(12) United States Patent
Gottschling et al.

(10) Patent No.: US 7,604,347 B2
(45) Date of Patent: Oct. 20, 2009

(54) SPECTACLE FRAME

(75) Inventors: Harald Gottschling, Berlin (DE); Philipp Haffmans, Berlin (DE); Daniel Haffmans, Berlin (DE); Moritz Krueger, Berlin (DE)

(73) Assignee: Mykita GmbH, Berlin (DE)

( * ) Notice: Subject to any disclaimer, the term of this patent is extended or adjusted under 35 U.S.C. 154(b) by 0 days.

(21) Appl. No.: 11/628,068

(22) PCT Filed: May 4, 2005

(86) PCT No.: PCT/DE2005/000866

§ 371 (c)(1), (2), (4) Date: Jan. 2, 2008

(87) PCT Pub. No.: WO2005/116726

PCT Pub. Date: Dec. 8, 2005

(65) Prior Publication Data

US 2008/0137029 A1   Jun. 12, 2008

(30) Foreign Application Priority Data

May 28, 2004   (DE) .................. 10 2004 027 012

(51) Int. Cl.
*G02C 1/08* (2006.01)
(52) U.S. Cl. .................. 351/90; 351/97; 351/121; 351/153; 16/228
(58) Field of Classification Search .................. 351/41, 351/90–102, 111–112, 153; 16/228
See application file for complete search history.

(56) References Cited

U.S. PATENT DOCUMENTS

| 1,779,789 A | 10/1930 | Wells et al. |
| 5,418,581 A * | 5/1995 | Conway ................ 351/116 |
| 7,410,252 B2 * | 8/2008 | Yang et al. ................ 351/90 |

FOREIGN PATENT DOCUMENTS

| DE | 89 02 196 U1 | 3/1989 |
| DE | 298 06 448 U1 | 8/1998 |
| EP | 0 863 424 A1 | 9/1998 |
| EP | 0 877 278 A1 | 11/1998 |
| GB | 734 208 A | 7/1955 |

* cited by examiner

*Primary Examiner*—Huy K Mai
(74) *Attorney, Agent, or Firm*—Kriegsman & Kriegsman

(57) ABSTRACT

Eyeglass frame, which consists of a frontal eyeglass rim and two eyeglass temples, which are linked to the frontal eyeglass rim by means of connecting clips.

14 Claims, 25 Drawing Sheets

SPECTACLE FRAME

Figure 1A:
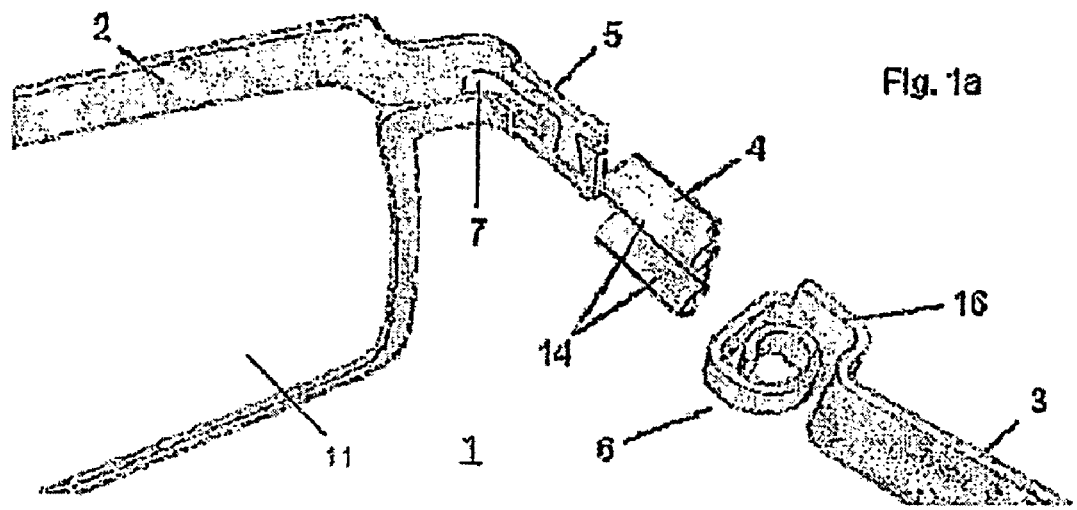

The present invention relates to an eyeglass frame and a process for producing an eyeglass frame.

Eyeglass frames are known in a large diversity of forms and types. These forms are subject frequently to the fashion prevailing at any time. Used for them are the most diverse types of eyeglass hinges in order to link the rim of the lenses to the eyeglass temples. In many cases, this linkage is produced by a screwed hinge. This has the drawback that, when the screwing is too tight, the hinge can be moved only with difficulty or that, when the hinge is adjusted too loosely, the screw easily falls out. A locking of the eyeglass temples in an unfolded or a folded-together position is not possible with these eyeglass hinges.

The object of the invention is therefore to provide an eyeglass frame whose eyeglass temples can be locked in an unfolded or in a folded position.

The invention is solved by an eyeglass frame that consists of a frontal eyeglass rim and two eyeglass temples, which are linked to the frontal eyeglass rim through connecting clips.

The eyeglass frame is made of a flat material, such as, for example, metal, carbon, or plastic, which can be coated entirely or in part. Thus, it is possible to coat the eyeglass frame entirely or in part with plastics or by lacquer coatings.

Preferably, the frontal eyeglass rim is designed for receiving two eyeglass lenses, the terminal ends of the frontal eyeglass rim having openings for receiving eyeglass lenses. The openings make it possible to open the eyeglass rim so wide that eyeglass lenses can be fitted into the recesses of the frontal eyeglass rim. In this embodiment, the lens requires a groove, which, prior to insertion of the lens, is ground into the glass by the optician.

The frontal eyeglass rim preferably forms essentially one plane, with connecting brackets being positioned at a bent angle on the terminal ends of the plane. Further preferably, the connecting brackets consist of an upper element and a lower element, which grip each other.

The elements of the connecting brackets grip each other preferably in such a way that the elements cannot be displaced with respect to each other in at least three spatial directions.

In the framework of the present invention, spatial directions are understood to refer to the six directions in space that are spanned by an orthogonal axis system and that each have a "+" and a "−" spatial direction along the spatial axis. In the sense of the present invention, the three spatial axes "x," "y," and "z" thus constitute the six spatial directions "−x," "+x," "−y," "+y," "−z," and "+z."

Both the upper and the lower elements of the connecting bracket can be moved. The directions of motion given in the present invention relate only to the upper element, however.

In a preferred embodiment of the invention, the connecting brackets consist of an upper and a lower element, which together form a dovetail-like linkage. A dovetail-like linkage has the advantage that it can be produced very flatly and yet enables a secure linkage. Such a linkage would block a displacement of the elements of the connecting bracket in four spatial directions.

Preferably, the elements of the connecting bracket have at least one part of reduced material thickness and at least one of the elements has at least one part of normal material thickness, the elements gripping each other in such a way that the respective parts of reduced material thickness lie on one another. The eyeglass frame is produced in this case from a flat material by milling, etching, laser etching, punching, or eroding. Further suitable processes are known to the person skilled in the art.

In this process step, a reduction of material in the region of the upper and lower elements is conducted simultaneously. However, it is also possible to conduct the material reduction of the upper and lower elements in separate operating steps.

The eyeglass frame can be machined in such a way that the upper and lower elements of the connecting bracket have a reduced thickness, the thickness of the upper element and of the lower element together corresponding to the normal thickness of the frontal eyeglass rim. Such an embodiment prevents a mutual displacement of the connecting bracket in the +z, −z, and −y directions. If only a portion of the upper and lower elements is reduced in material thickness, the other portion is left in its normal thickness and the respective oppositely-lying element is designed in such a way that it is also reduced in its material thickness—for example, each by 50%; then, the two elements grip each other in such a way that a displacement in a +z, −z, +x, and −x direction is prevented, because they abut against the portion of the element that was left in the normal thickness of the frontal eyeglass rim. In this case, the elements of the connecting bracket would be blocked in movement in four spatial directions.

An embodiment in which the upper and the lower elements are each entirely reduced in their material thickness would, however, only prevent a displacement of the elements against each other in one spatial direction, so that such an embodiment is unstable. Through the design of the lower element and of the upper element with several portions of reduced material thickness or without a reduction in material thickness, it is possible to block the displacement of the elements of the connecting bracket in additional directions.

However, embodiments are also possible in which the elements of the connecting bracket grip each other in such a way that the elements cannot be displaced relative to each other in all six spatial directions. Such an embodiment may be obtained, for example, in that preferably the upper and the lower element of the connecting bracket can lock in place in each other. This has the advantage that it is possible to dispense with the use of a connecting clip, although the latter can also be used as an additional securing mechanism or to serve for receiving the spiral-shaped end of the eyeglass temples. In such an embodiment, the parts of reduced material thickness are designed in such a way that they have a structural widening in the direction toward the respective opposite-lying upper or lower element.

The connecting bracket preferably has mechanisms that prevent a slipping of the connecting clip. The connecting bracket is the connecting element between the eyeglass temples and the frontal eyeglass rim. It also fulfills, in interaction with the connecting clip, the function of a keeper, which holds the eyeglass rim together. Furthermore, a subsection of the surface of the connecting bracket (namely, where the upper and lower elements grip each other) is an important component for the operation of the hinge.

The mechanisms for preventing a slipping can preferably be a projection on the outer side of the connecting bracket and/or a depression in the connecting bracket. This element makes it possible to lock in place the closing clip securely on the connecting bracket. The reversible fastening of the connecting clip allows the eyeglass frame to be disassembled at any time. However, it is also possible to lock the closing clip permanently in place, so that a disassembly of the eyeglass frame after its production is no longer possible.

The upper element and the lower element of the connecting bracket form a plane, the upper element and the lower element gripping each other in such a way that a displacement in the case of a dovetail-like linkage, for example, is not possible in the plane.

The connecting clip grips around the upper element and the lower element in such a way that at least one flank of the connecting clip grips around both the upper and the lower elements. This prevents one element from slipping out of the connecting clip and results in a higher stability of the overall eyeglass frame.

In a preferred embodiment of the invention, the connecting clip is a part of the upper element or of the lower element.

In order to prevent a mutual displacement of the upper and lower elements (the upper and lower elements always must lie in alignment), the two elements are interlaced with each other through a dovetail-like linkage. The link can also be produced by a differently shaped linkage, however. Thus, in place of a dovetail-like linkage, also a circular, triangular, rectangular, polygonal or other geometrical shaping of the one element is possible, which can be inserted into a recess matching this shape and serving the purpose of, namely, preventing a displacement in the plane.

In a preferred embodiment of the invention, the eyeglass temple has a spiral-shaped end. At its front end facing the frontal eyeglass rim, the eyeglass temple forms a stepped shaped indentation, into which the narrower, outer end of the eyeglass temple is curled, first in a bent manner, then spirally.

The spiral-shaped, curled end is designed here in such a way that it inserts through the opening between the links of the upper and lower parts of the connecting bracket. In so doing, the spiral-shaped end of the eyeglass temple embraces preferably the connecting clip and the connecting bracket. The stepped shaping at the front end of the eyeglass temple has the function here of holding the eyeglass temple securely in its mounted position as well as of preventing any play of the eyeglass temple in the horizontal plane in the unfolded state.

Preferably, the connecting clip embraces the connecting bracket, so that the linkage between the upper and lower elements is closed. The connecting clip has two functions here; first, it serves to hold together the frontal eyeglass rim after insertion of the lenses and, second, it serves to guide and stabilize the eyeglass temple in the horizontal plane both in the opened and in the closed state.

The two curled flanks of the connecting clip preferably form a channel, in which the coil spring of the eyeglass temple is positioned. To this end, the connecting clip is pushed onto the connecting bracket and locks in place there. The two curled flanks of the clip then form a channel, in which the coil spring of the eyeglass temple is positioned after the eyeglass temple has been mounted.

In a preferred embodiment of the invention, the connecting bracket, the connecting clip, and the spiral-shaped end of the eyeglass temple form a coil spring hinge. This coil spring hinge allows the eyeglass temples to be smoothly bent. Further, coil spring hinges prevent the eyeglass temples from springing open uncontrollably, such as, for example, can occur when the eyeglasses are carried in a shirt pocket.

Furthermore, the problem of the present invention is solved by a process for producing an eyeglass frame, in which, in a first step, eyeglass lenses are inserted into the frontal eyeglass rim, the connecting clip is pushed onto the connecting bracket until it locks in place, and then the eyeglass temples, with their narrow, outermost, spiral-shaped, curled ends, are passed through the remaining slots of the connecting brackets, which have already been closed by the connecting clips, of the frontal eyeglass rim and the eyeglass temples are pulled backwards into the side facing away from the eyeglass rim and lock in place there. The assembly is possible here without the use of tools.

Figure 1B:
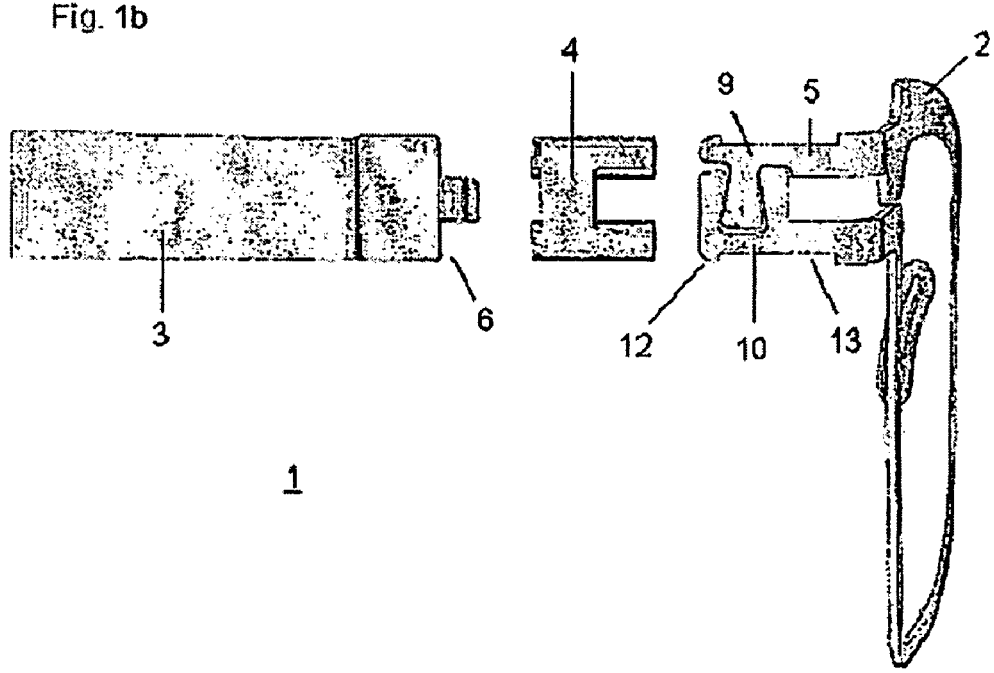
Figure 2A:
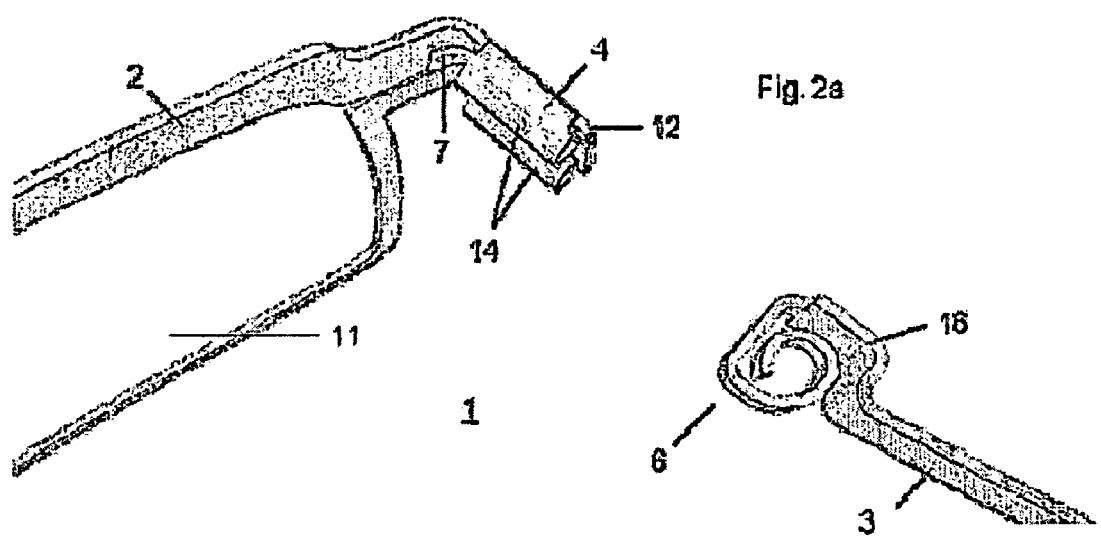
Figure 2B:
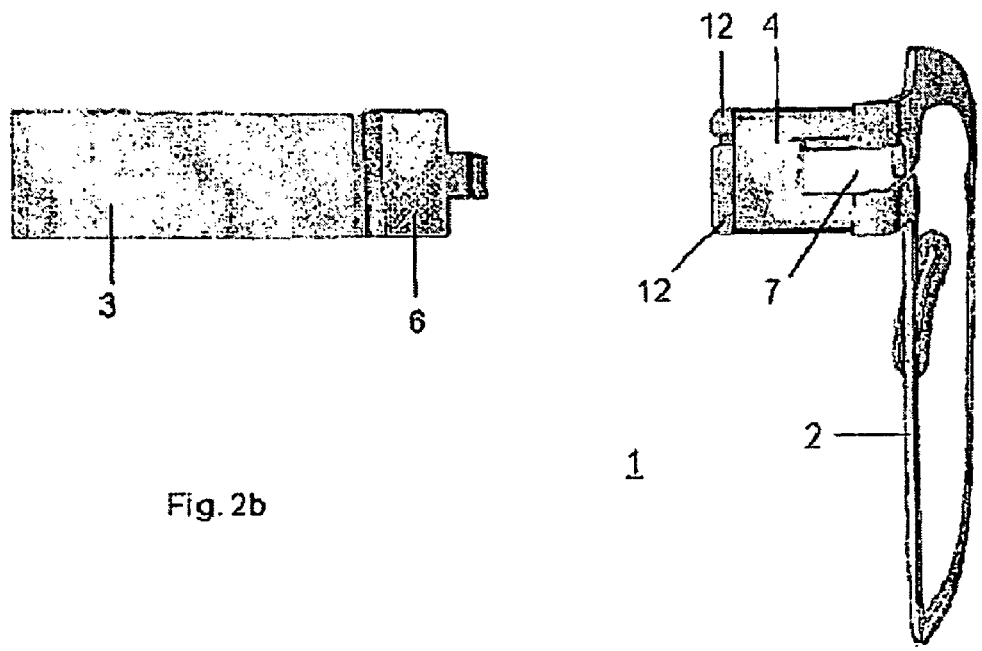
Figure 3A:
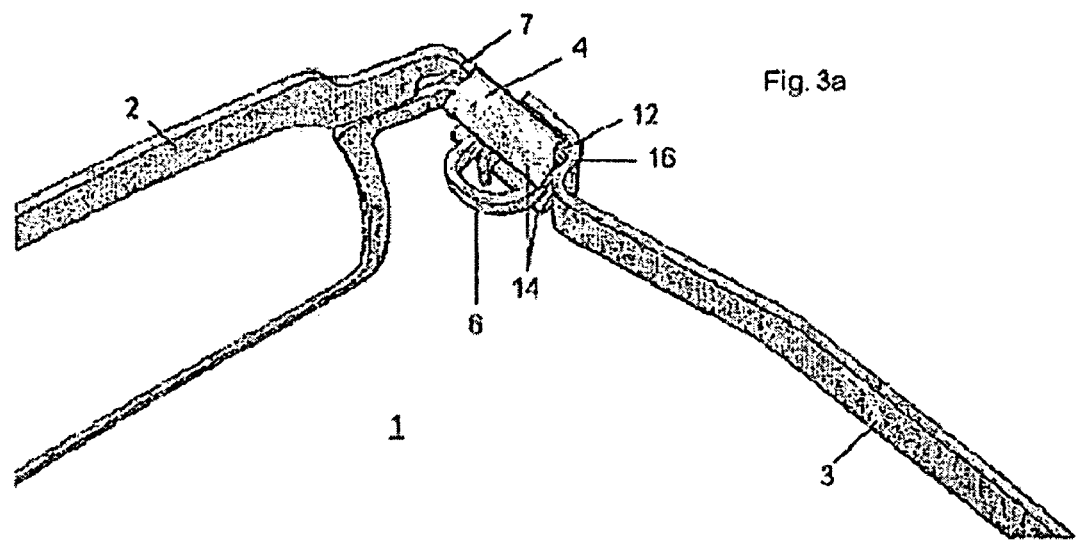
Figure 3B:
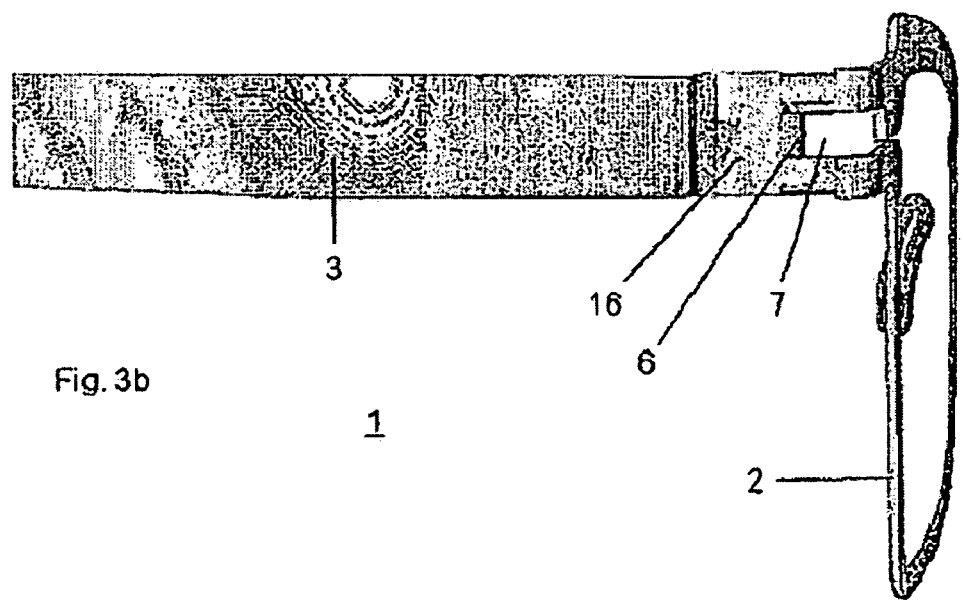
Figure 4A:
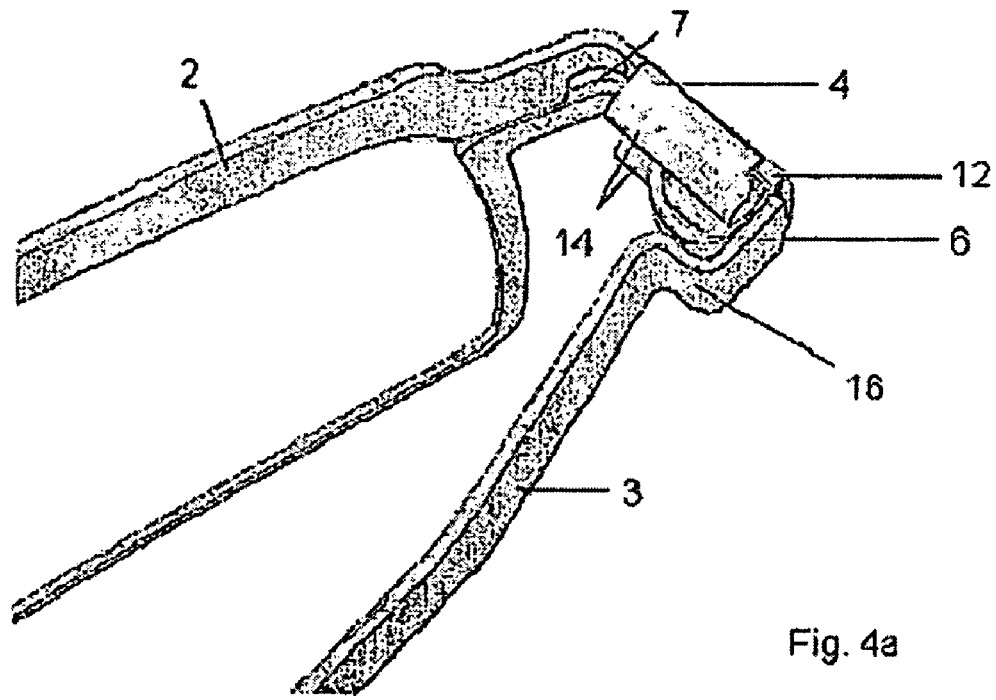
Figure 4B:
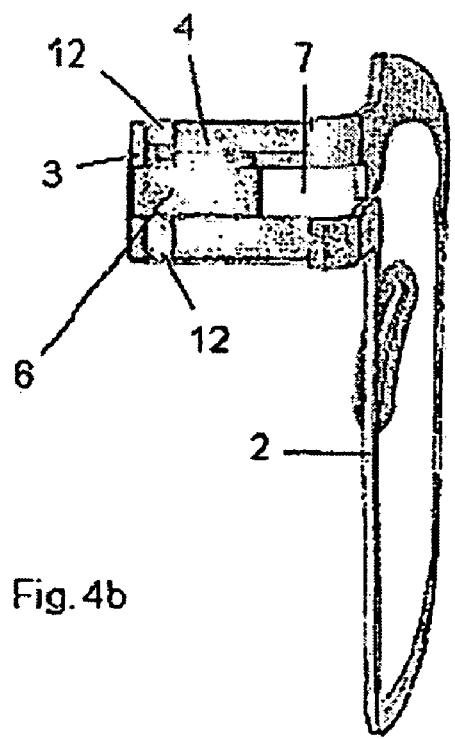
Figure 5A:
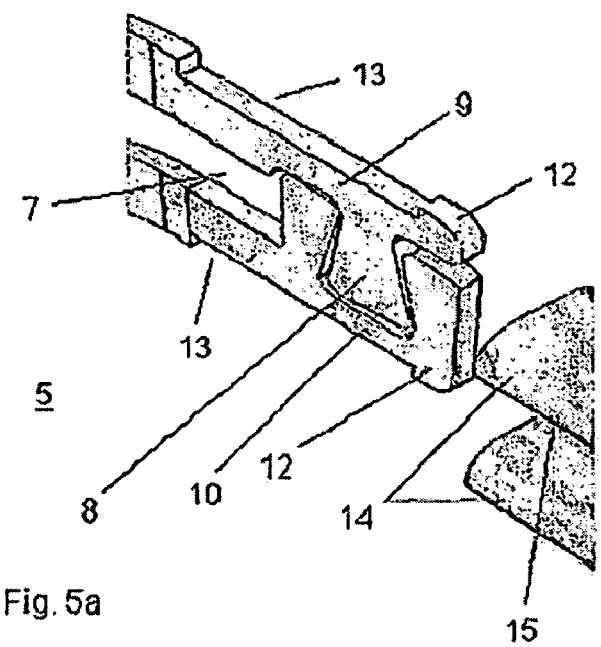
Figure 5B:
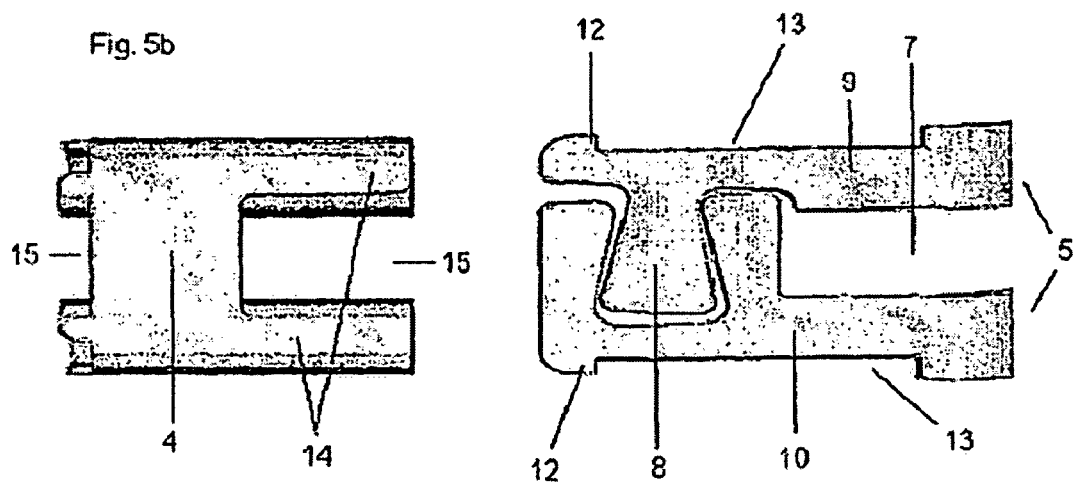
Figure 6:
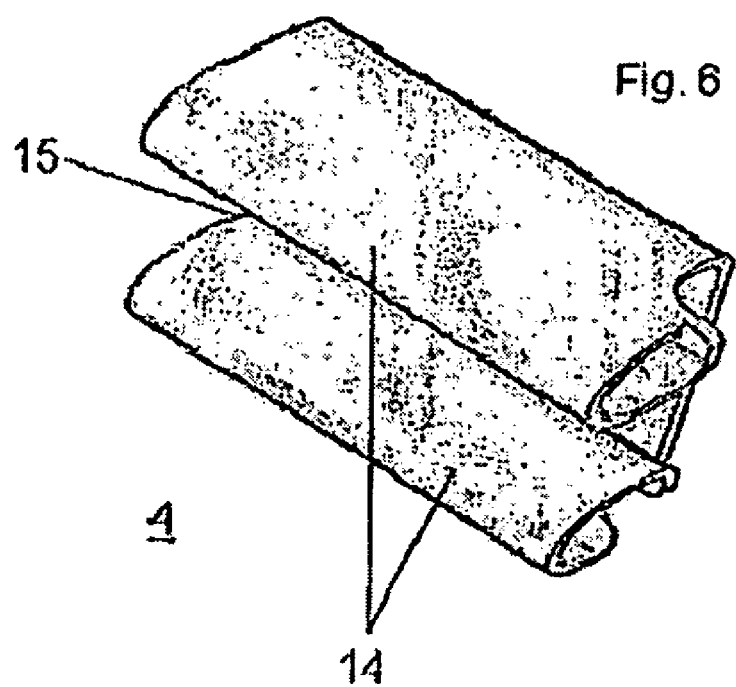
Figure 7:
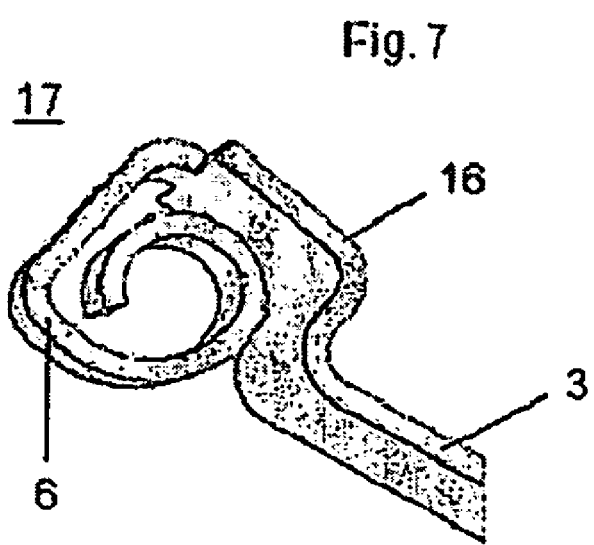
Figure 8A:
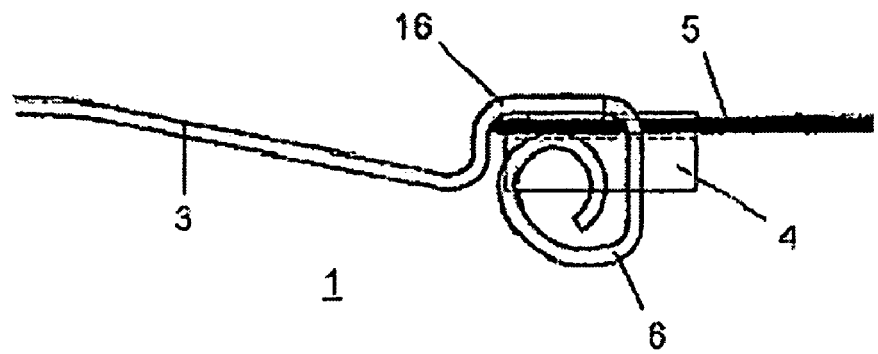
Figure 8B:
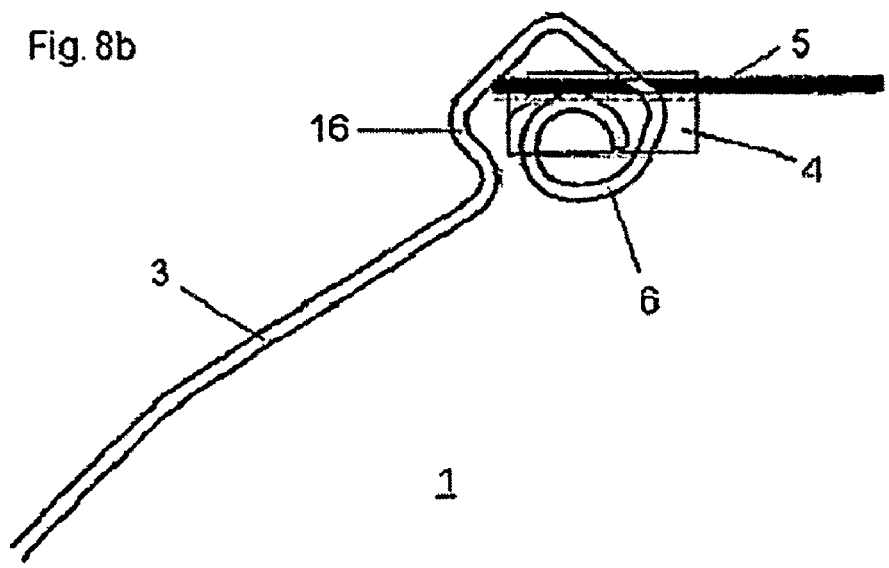
Figure 9:
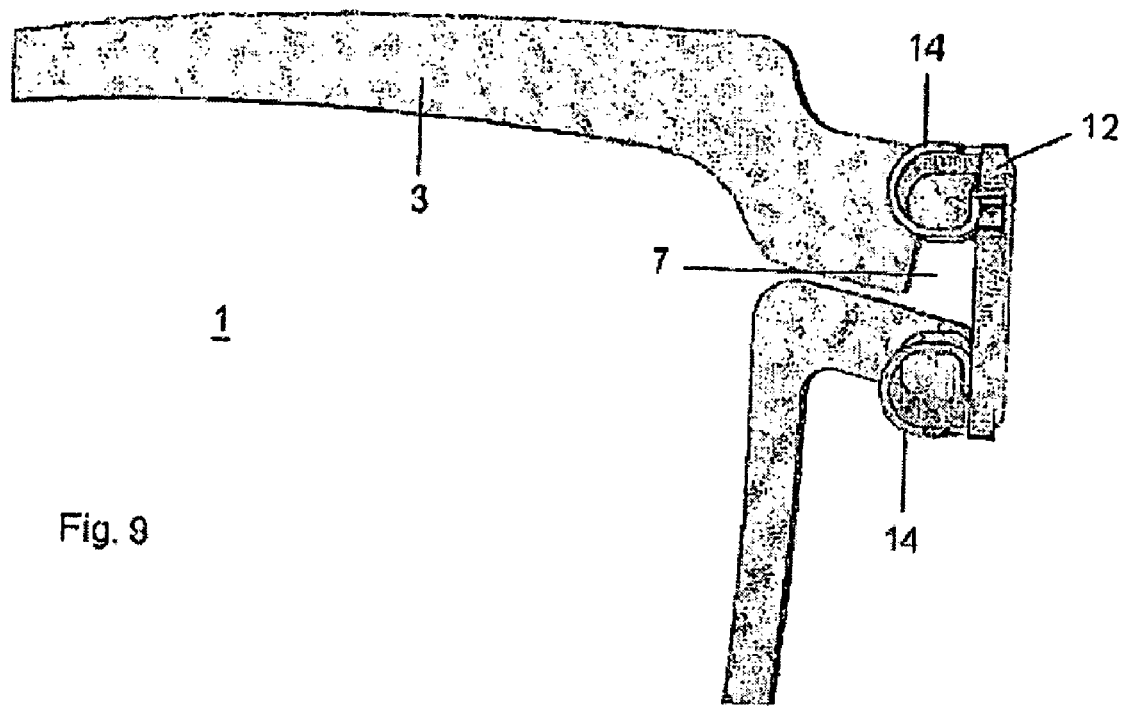

The present invention will be described in more detail below on the basis of figures and of an example. Shown in detail is the following:

FIGS. 1a and 1b the components of the present invention,

FIGS. 2a and 2b the frontal eyeglass rim with slid-on connecting clip,

FIGS. 3a and 3b the eyeglass hinge in the mounted state,

FIGS. 4a and 4b the eyeglass frame in the mounted, folded-together state,

FIGS. 5a and 5b the dovetail linkage,

FIG. 6 the connecting clip,

FIG. 7 the end of the eyeglass temple with the spiral-shaped bent end,

FIGS. 8a, 8b, and the spiral hinge in various positions during bending of the 8c eyeglass temple, FIG. 9 the connecting bracket with the connecting clip, FIG. 10 various embodiments of the upper and lower elements, FIGS. 11 a and b the front and back side of a frontal eyeglass rim, FIGS. 12 a and b the front and back sides of another design of the frontal eyeglass rim, FIGS. 13 a-c a depiction of the connecting bracket, FIGS. 14 a and b the connecting bracket of FIGS. 13 a-c from another angle of view, FIGS. 15 a-e a perspective depiction of an embodiment of the elements of the connecting bracket, FIGS. 16 a-e another perspective depiction of an embodiment of the elements of the connecting bracket, FIGS. 17 a-e yet another perspective depiction of an embodiment of the elements of the connecting bracket, and FIGS. 18 a-e another perspective depiction of an embodiment of the connecting bracket.

FIGS. 1a and 1b show the eyeglass frame 1, consisting of a frontal eyeglass rim 2, two eyeglass temples 3, and a connecting clip 4. Two bent connecting brackets 5 are located on the eyeglass rim 2.

FIGS. 2a and 2b show the eyeglass frame 1 from two different angles of view. Here, the connecting clips 4 have already been inserted over the connecting bracket 5. Located above and below the dovetail-like linkage, on the upper and on the lower edges of the connecting bracket, is a respective recess, which offers a secure hold for the connecting clip, which ensures that the upper and lower elements are held together. The recesses on the connecting brackets have the effect of a detent, which, when the connecting clip is installed, ensure that it cannot slip off of the rim.

FIGS. 3a and 3b show perspective views of the eyeglass frame 1, for which the frontal eyeglass rim 2 is joined to the eyeglass temples 3 by means of a connecting clip 4. The spiral-shaped end 6 of the eyeglass temple 3 thereby embraces the connecting bracket 5 and the connecting clip 4.

FIGS. 4a and 4b show the same views as FIGS. 3a and 3b, but for eyeglasses that are folded.

FIGS. 5a and 5b show the connecting bracket 5 with the opening 7. The opening 7 of the frontal eyeglass rim 2 is closed by a dovetail-like linkage 8. The dovetail-like linkage 8 is formed by an upper element 9 and a lower element 10 of the connecting bracket 5. The connecting bracket 5 has mechanisms that enable a locking in place of the connecting clip 4. These mechanisms can protect in various ways the connecting bracket 5 against slipping out; thus the connecting bracket 5 can be formed with a projection 12 of the material and/or a depression 13.

FIG. 6 shows the connecting clip 4, which has two curled flanks 14. The flanks 14 form a channel 15, into which the spiral-shaped end 6 of the eyeglass temple 3 is inserted.

FIG. 7 shows a spiral-shaped end 6 of the eyeglass temple 3. At its front end facing the eyeglass rim 2, the eyeglass temple 3 forms a stepped indentation 16 in which the narrower, outer end of the eyeglass temple 3 is curled, first in a bent manner, then spirally. The stepped shaping at the front end of the eyeglass temple 3, moreover, has the function of holding the eyeglass temple 3 securely in its mounted position.

FIG. 8a shows the eyeglass temple 3 in opened position. The dovetail linkage 8 depicted in FIGS. 5a and 5b forms, in connection with one part of the connecting clip 4, the hinge plane of the coil spring hinge 17. The front end 6 of the eyeglass temple 3, which is formed by the spiral-shaped end 6 and the stepped indentation 16, circles around this surface 18.

The surface of the dovetail linkage 8 is wedged between the stepped shaped indentation 16 and the outer end 6 of the eyeglass temple 3 due to the inherent spring tension of the coil spring. In this static position, the eyeglass temple 3 is held firmly on the connecting bracket 5.

Figure 8C:
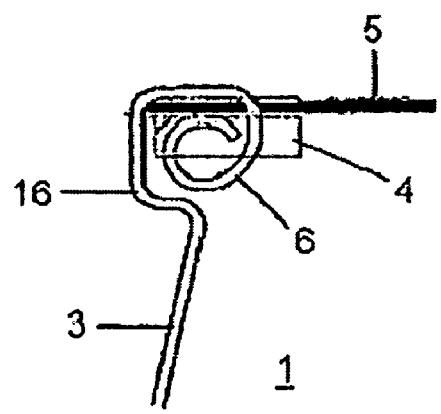

FIG. 8b shows the eyeglass temple 3 at the moment when it is folded over. The spiral-shaped end 6 of the eyeglass temple 3 with the indentation 16 has to wind around the surface that is formed by the dovetail linkage 8 in order to assume the closed state, as shown in FIG. 8c. In this process, the coil spring of the surface 18 (hinge plane) is displaced. If a specific point is reached when the eyeglass temple 3 is folded, the eyeglass temple 3 snaps over into the folded-together position, as depicted in FIG. 8c.

FIG. 8c shows the eyeglass temple 3 in the folded-together state. In FIG. 8c, the eyeglass temple 3 is once again in a static state. The coil spring has expanded and wound around the surface 18. Now, a state like that in FIG. 8a has once again been reached. The surface 18 of the dovetail linkage 8 is wedged between the stepped shaped indentation 16 and the outermost end of the eyeglass temple 3 of the coil spring on account of its inherent spring tension, with the difference that the eyeglass temple 3 is now no longer unfolded, but rather folded together and lying against the frontal eyeglass rim 2.

FIG. 9 shows the frontal eyeglass rim 2 with the connecting bracket 5, on which the connecting clip 4 is inserted. The two flanks 14 of the connecting clip embrace the connecting bracket 5 and prevent the upper and lower elements 9, 10 from drifting apart.

Located on the ends of the upper and lower elements 9, 10 for fixing the closing clip 4 in place are reinforcements projections, which prevent the connecting clip 4 from slipping.

Figure 10A:
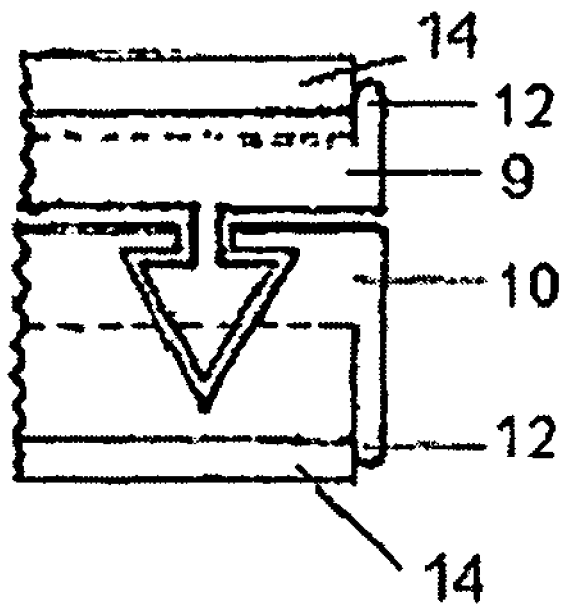
Figure 10B:
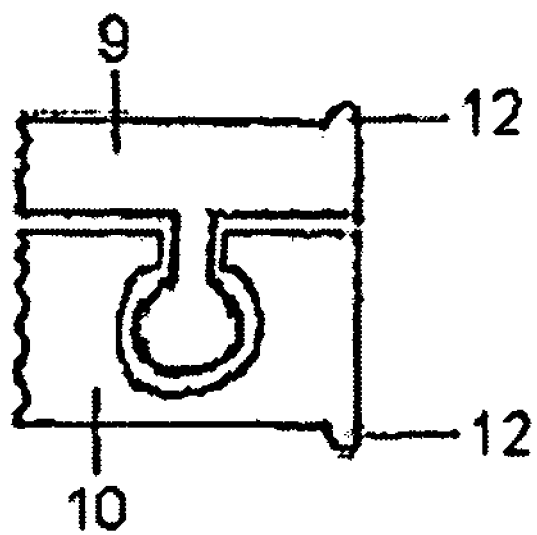
Figure 10C:
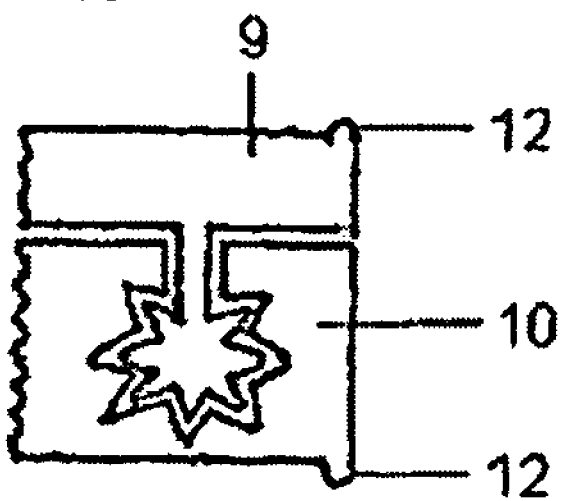

FIGS. 10a, 10b, and 10c show different embodiments of the linkage between the upper element 9 and the lower element 10 of the connecting bracket 5.

In FIG. 10a, the closing clip 4 is depicted inserted above the connecting bracket 5. One of the two curled flanks 14 thereby covers both the upper element 9 and the lower element 10, as shown by the bottom dashed line in FIG. 10a. However, it is also possible that both flanks 14 cover both the upper element 9 and the lower element 10. This covering of both elements 9 and 10 results in a stable linkage.

If only the upper element 9 or only the lower element 10 is covered by one of the flanks 14, then the linkage can loosen if one of the two elements 9 or 10 slips out.

Figure 11A:
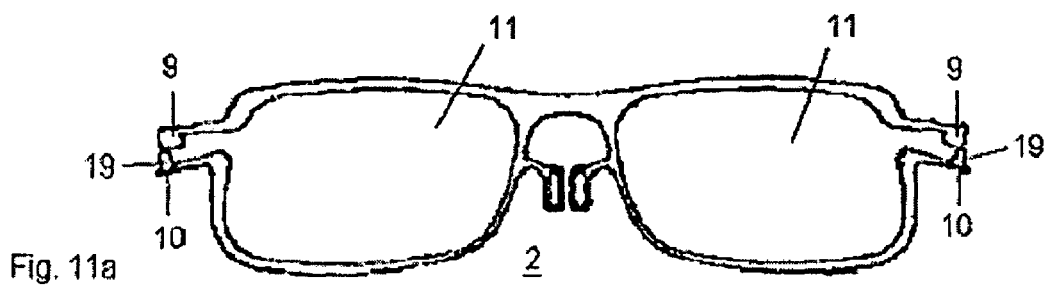
Figure 11B:
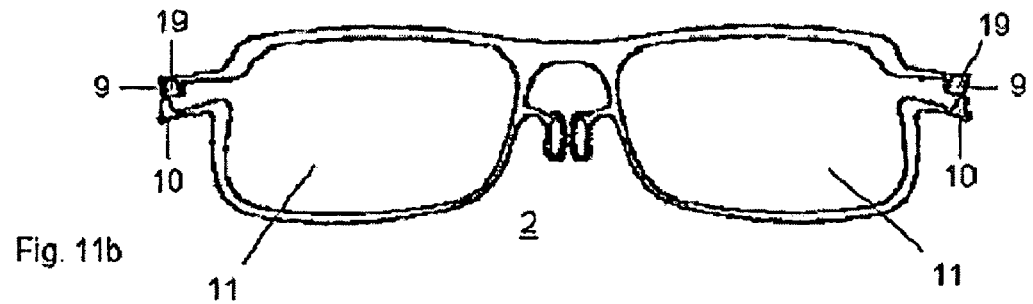

Shown in FIG. 11a is the back side and shown in FIG. 11b is the front side of an embodiment of the eyeglass frame 1, in which the bottom element 10 is reduced in its material thickness on one side by 50%, so that a portion of reduced material thickness 19 is formed. The upper element 9 is shaped in such a way that it also has in its middle a portion of reduced material thickness 19, into which fits the portion of reduced material thickness 19 of the element 10. The portion of reduced material thickness 19 of the bottom element 10 is shaped here in such a way that it abuts against the portions of normal material thickness of the upper element 9. In this way, a displacement of the two elements 9 and 10 in the +z and −z direction is prevented. If a closing clip 4 is pushed over the two element 9 and 10 of the connecting bracket 5, then a mutual displacement of the elements 9 and 10 is prevented in all six spatial directions.

Figure 12A:
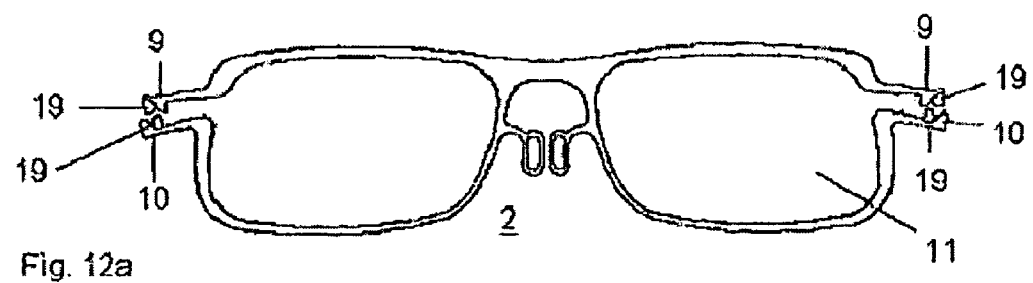
Figure 12B:
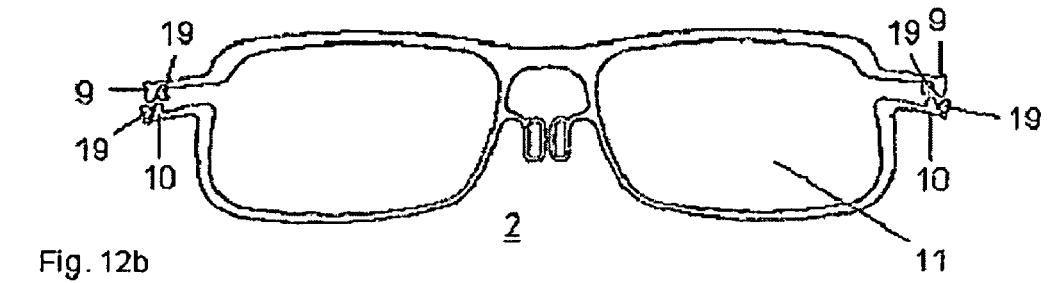

Shown in FIGS. 12a and 12b is an embodiment that is similar to the embodiment shown in FIGS. 11a and 11b. Here, FIG. 12a shows the back side and FIG. 12b shows the front side of this embodiment, for which the two elements 9, 10 have two portions of reduced material thickness 19, which are placed slightly offset from each other, so that they partially overlap. In this way, a displacement of the elements 9, 10 in the +x and −x, −y, +z, and −z spatial direction is prevented.

FIGS. 13 a-c and FIGS. 14 a and b show an embodiment of the connecting bracket 5 in which a material thickness has been left, as in the frontal eyeglass rim 2, a displacement of the upper element 9 relative to the lower element 10 is blocked in the −z, −y, +x, and −x spatial directions.

Figure 13A:
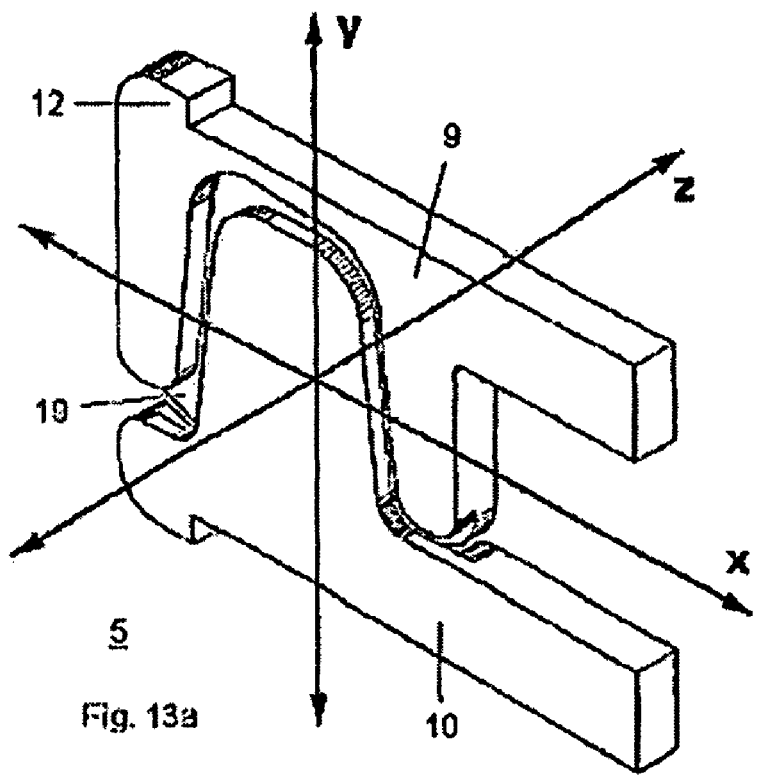
Figure 13B:
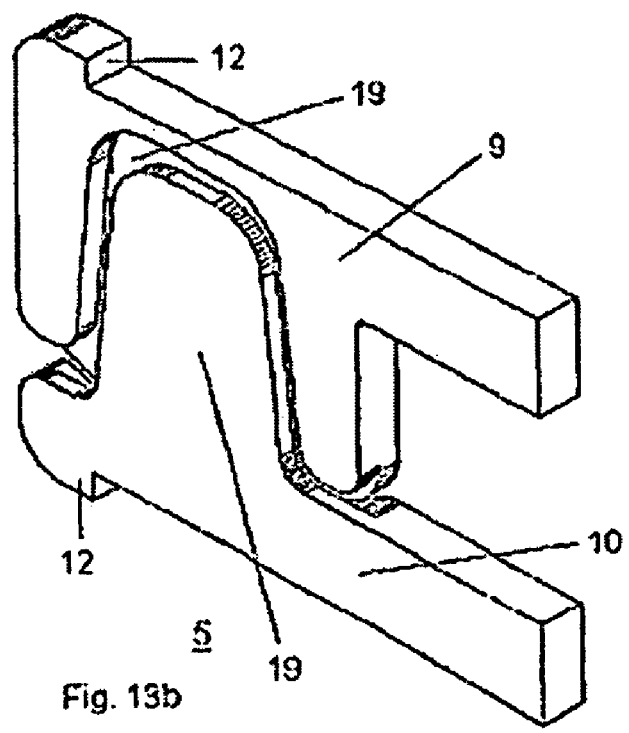

Shown in FIG. 13b is the same embodiment of the connecting bracket 5 as in FIG. 13a, for which the upper and the lower elements 9, 10 lie on each other.

Figure 13C:
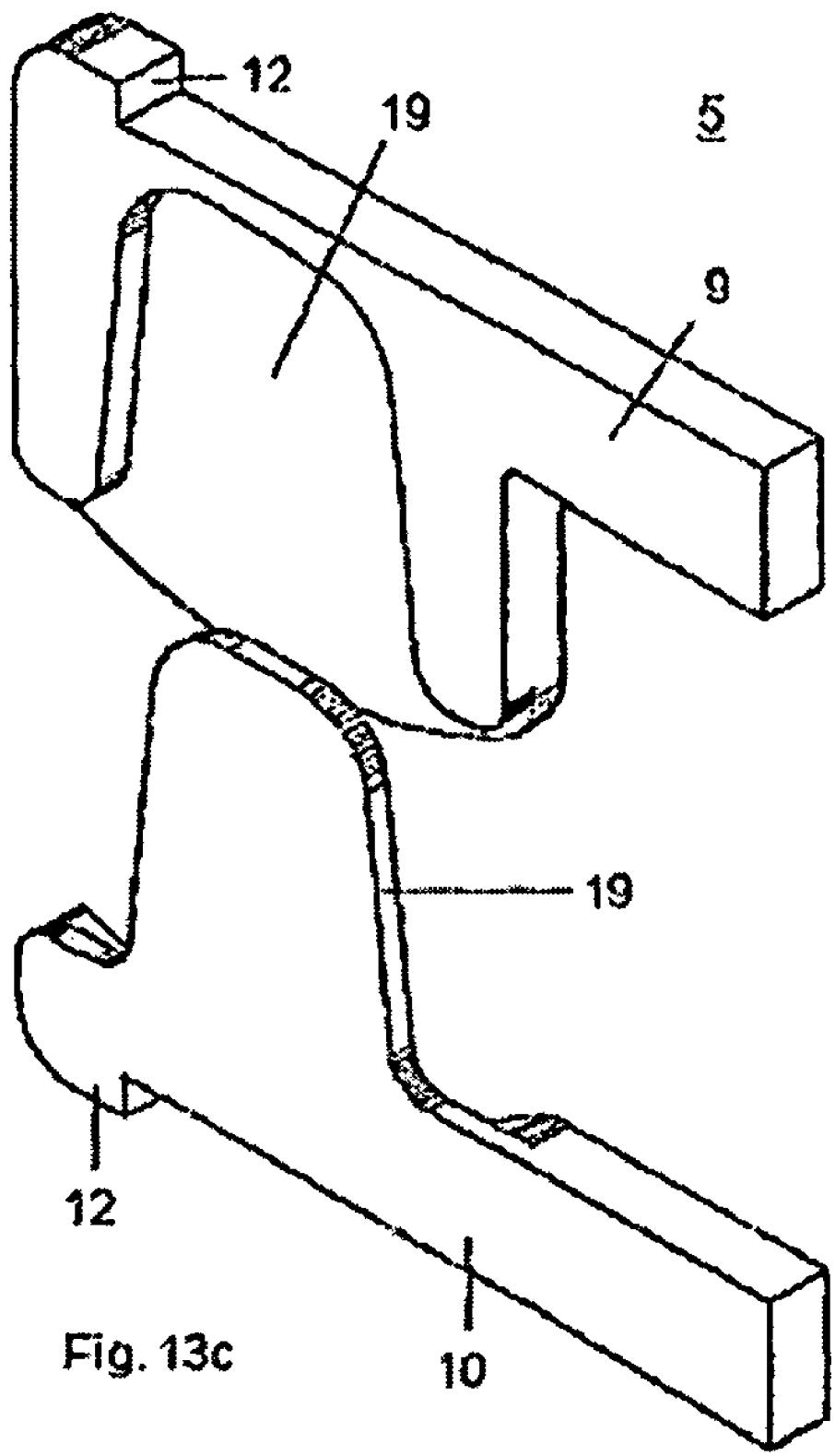

FIG. 13c shows the same embodiment as in FIG. 13b, for which the upper and the lower elements 9, 10 are depicted displaced away from each other in the y direction.

Figure 14A:
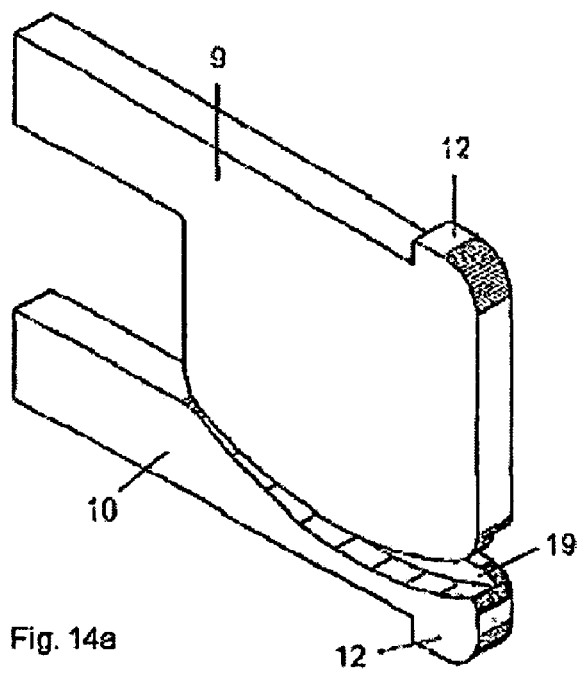
Figure 14B:
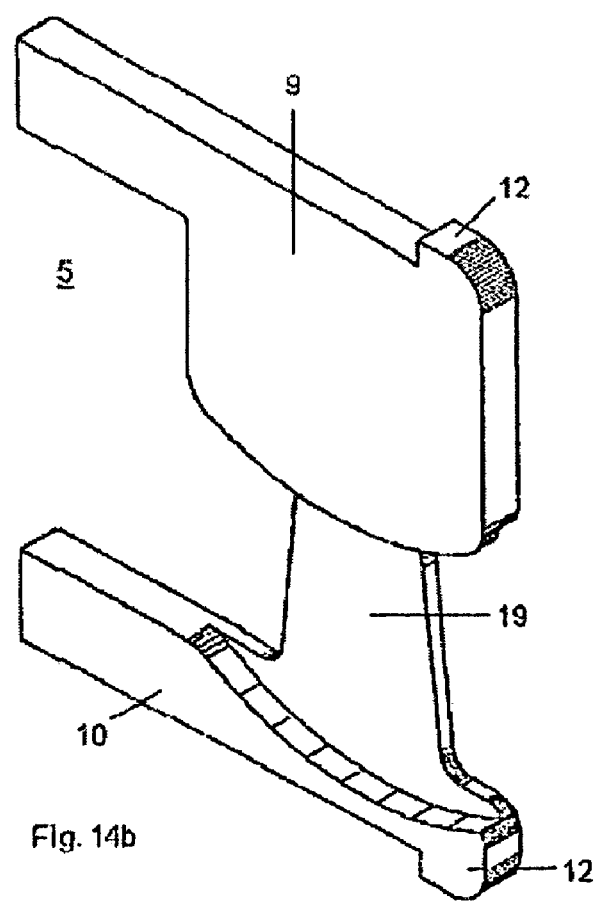
Figure 15A:
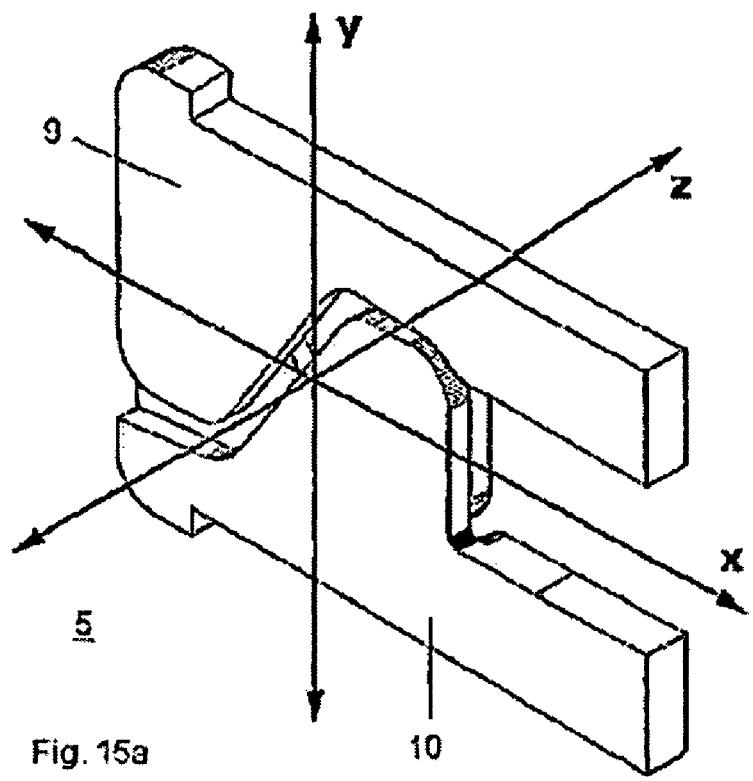
Figure 15B:
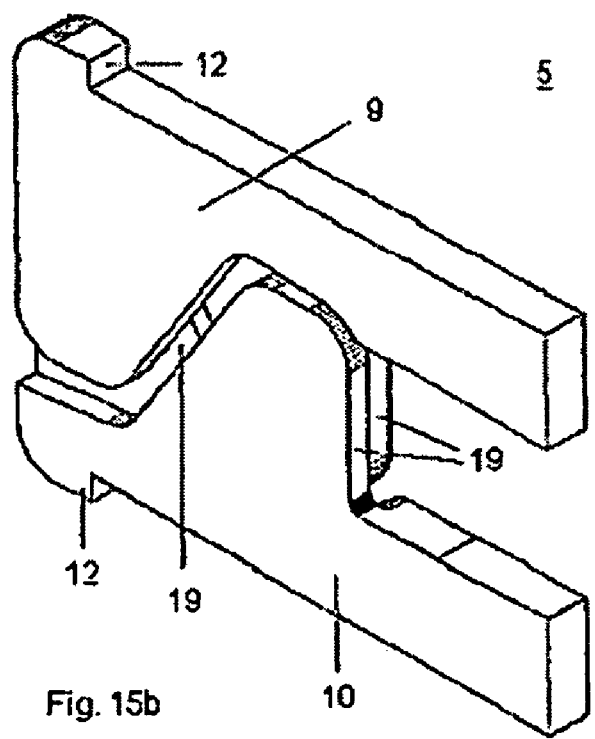
Figure 15C:
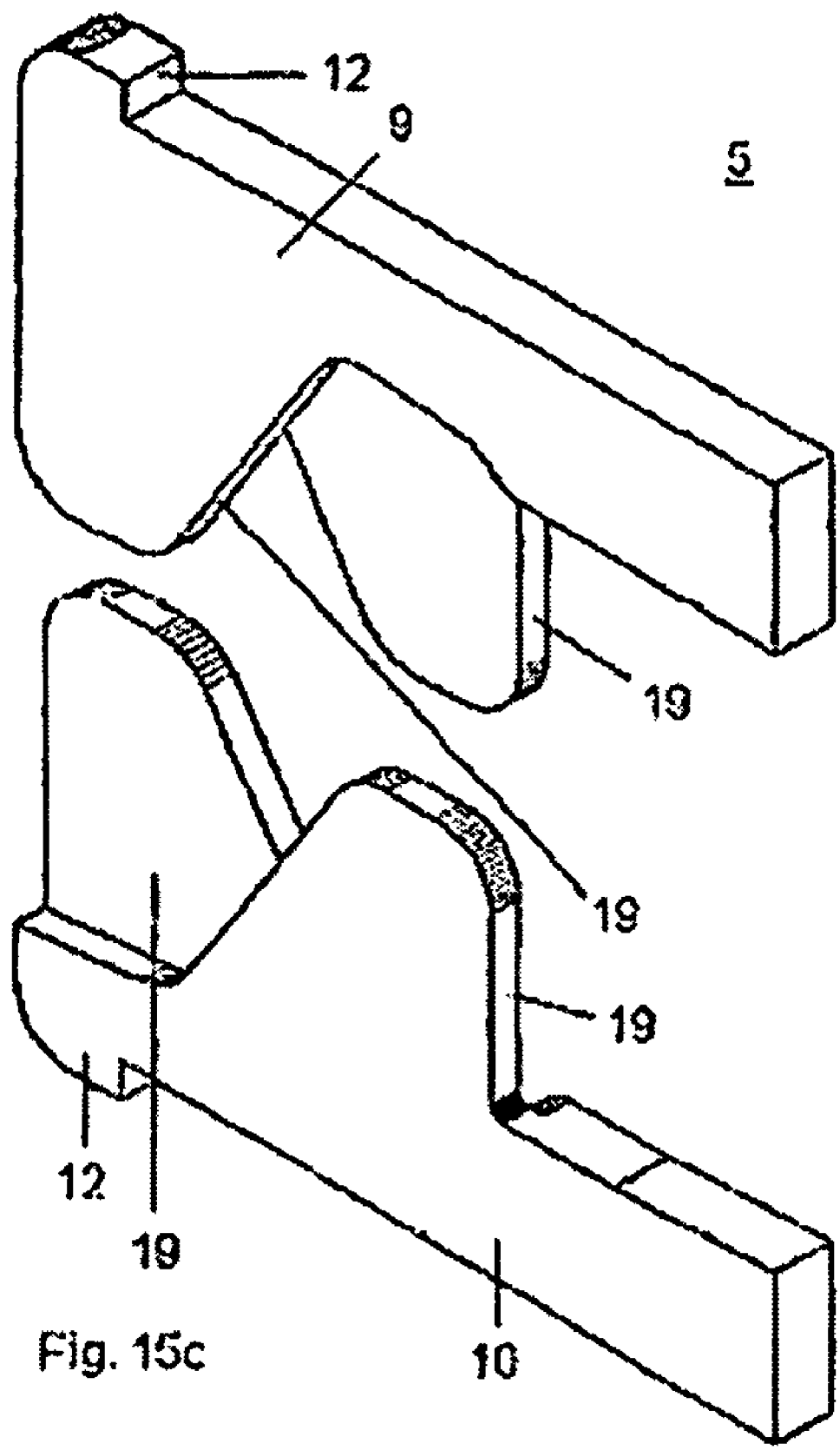
Figure 15D:
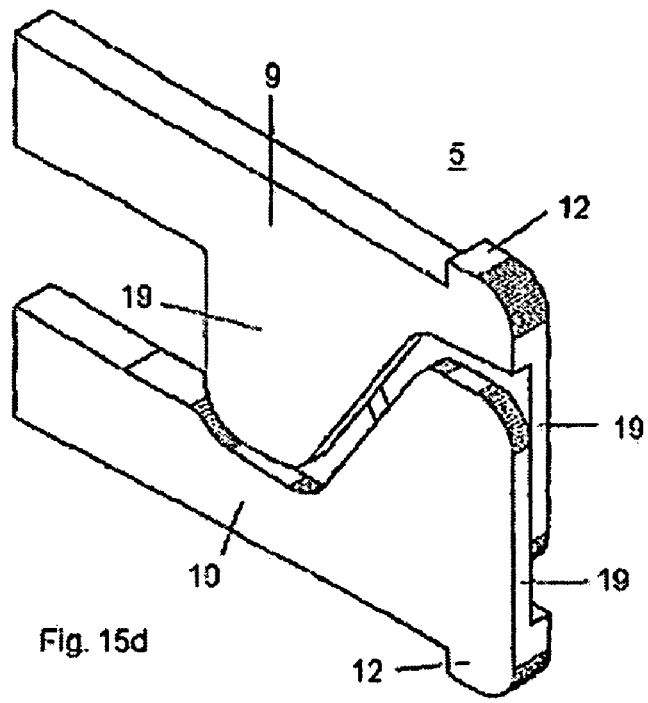
Figure 15E:
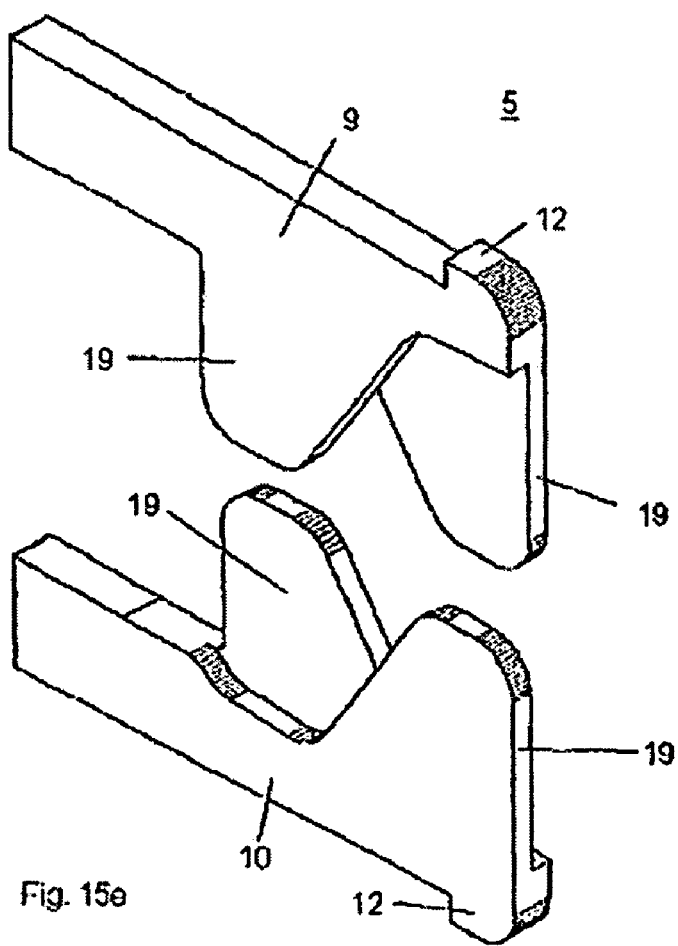
Figure 16A:
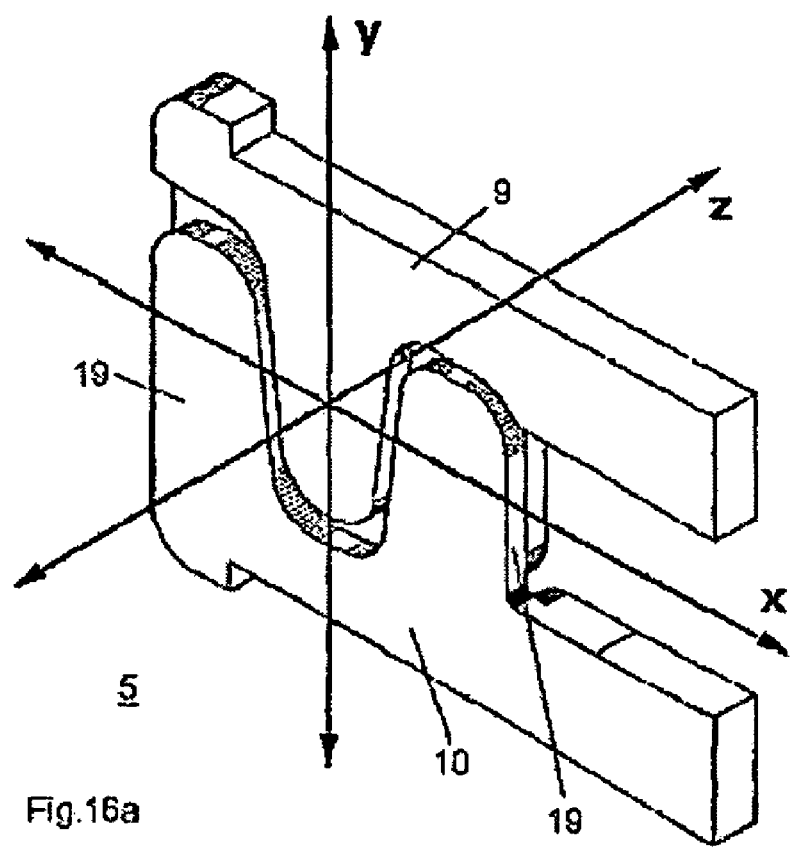
Figure 16B:
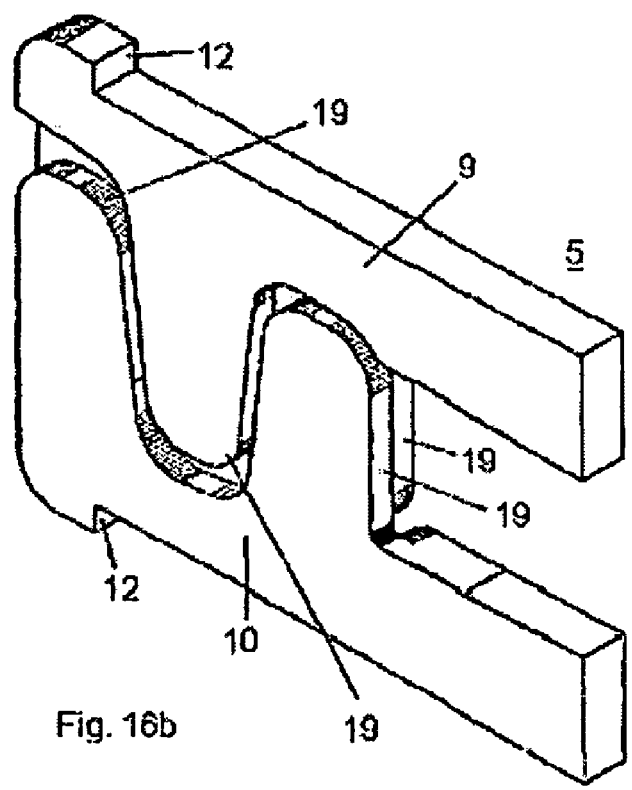
Figure 16C:
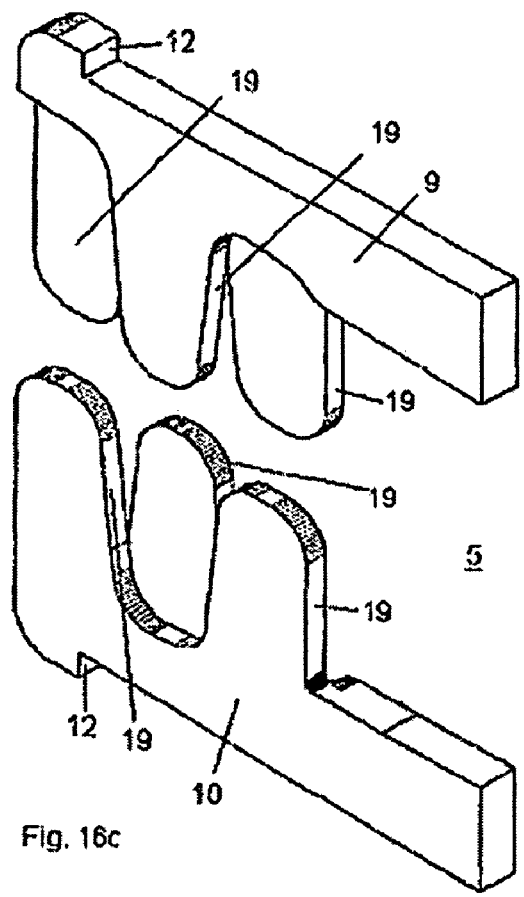
Figure 16D:
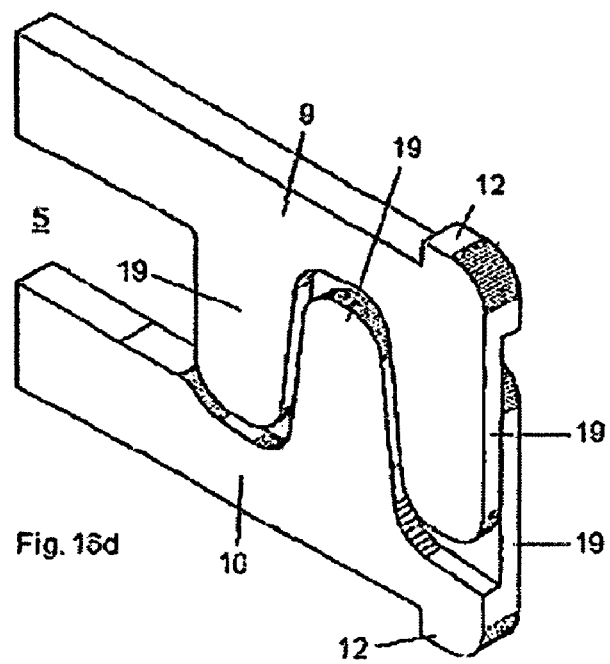
Figure 16E:
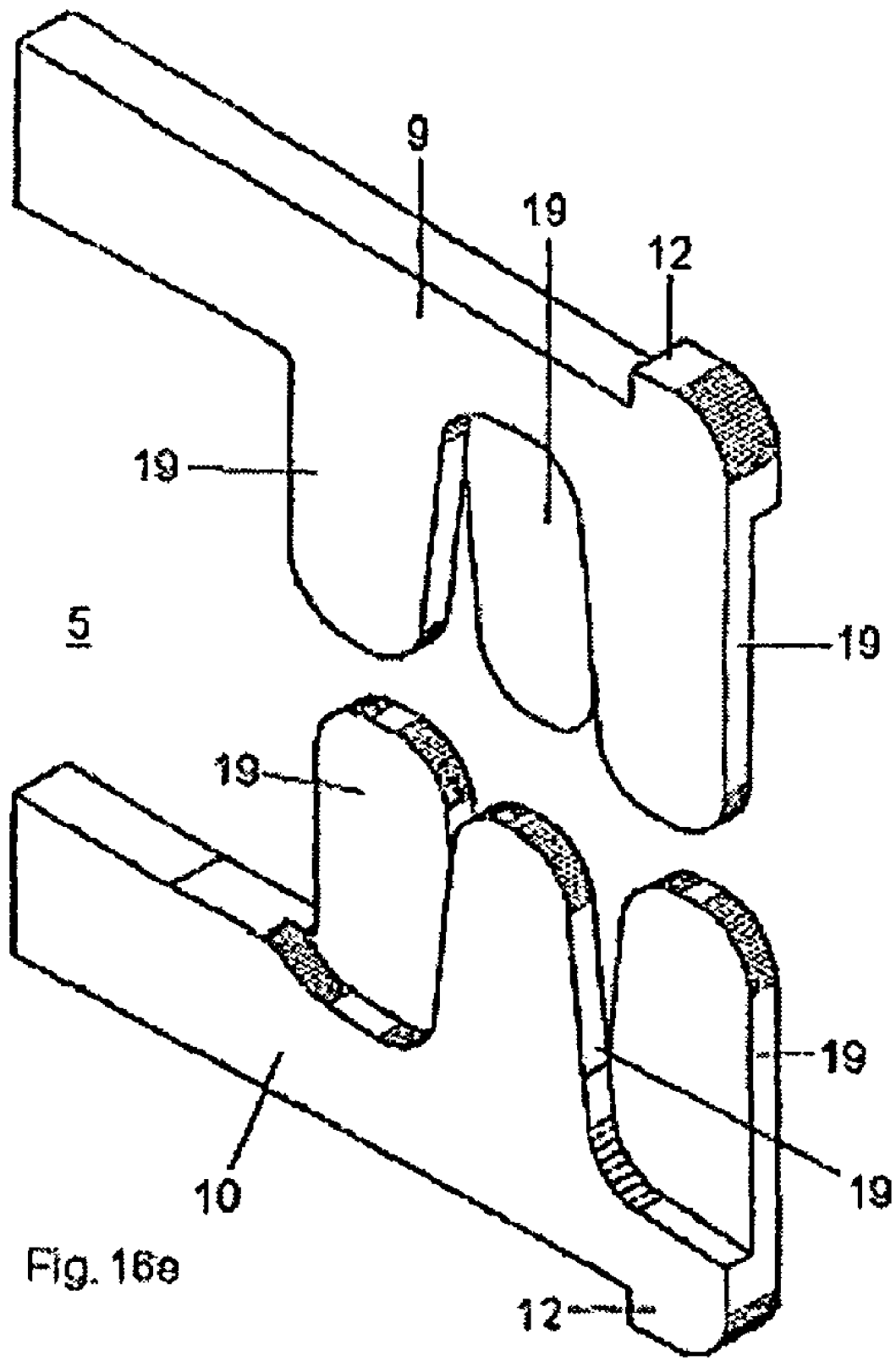
Figure 17A:
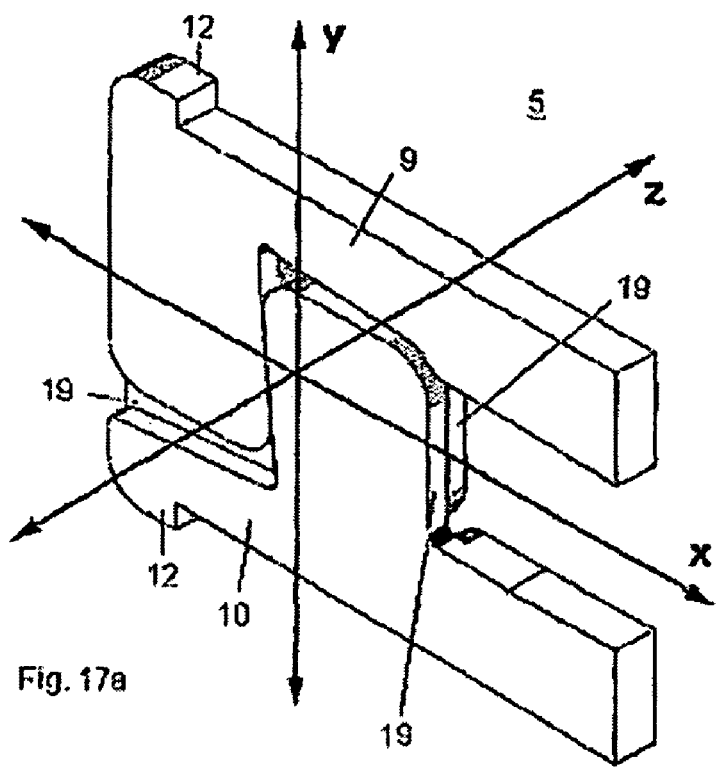
Figure 17B:
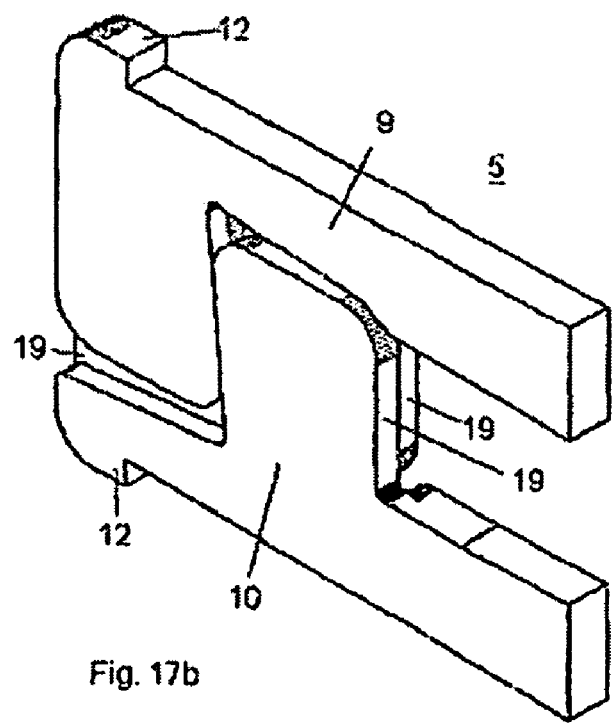
Figure 17C:
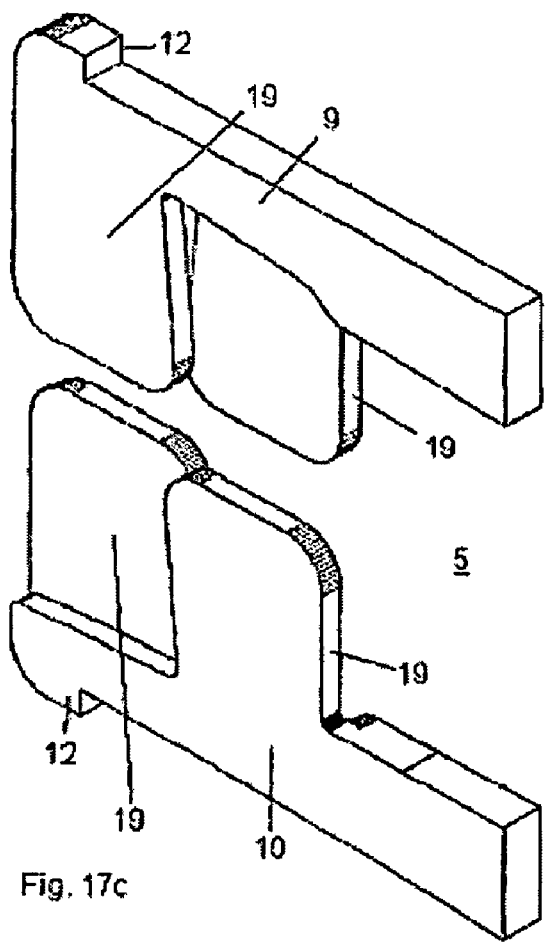
Figure 17D:
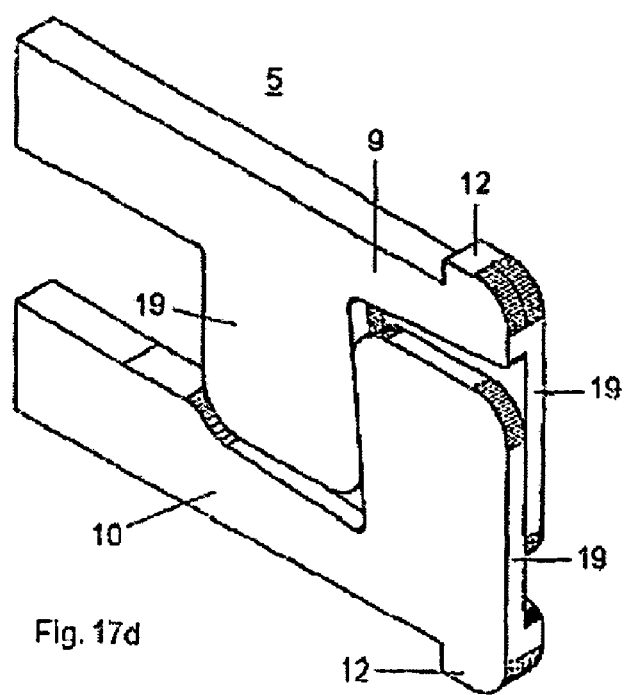
Figure 17E:
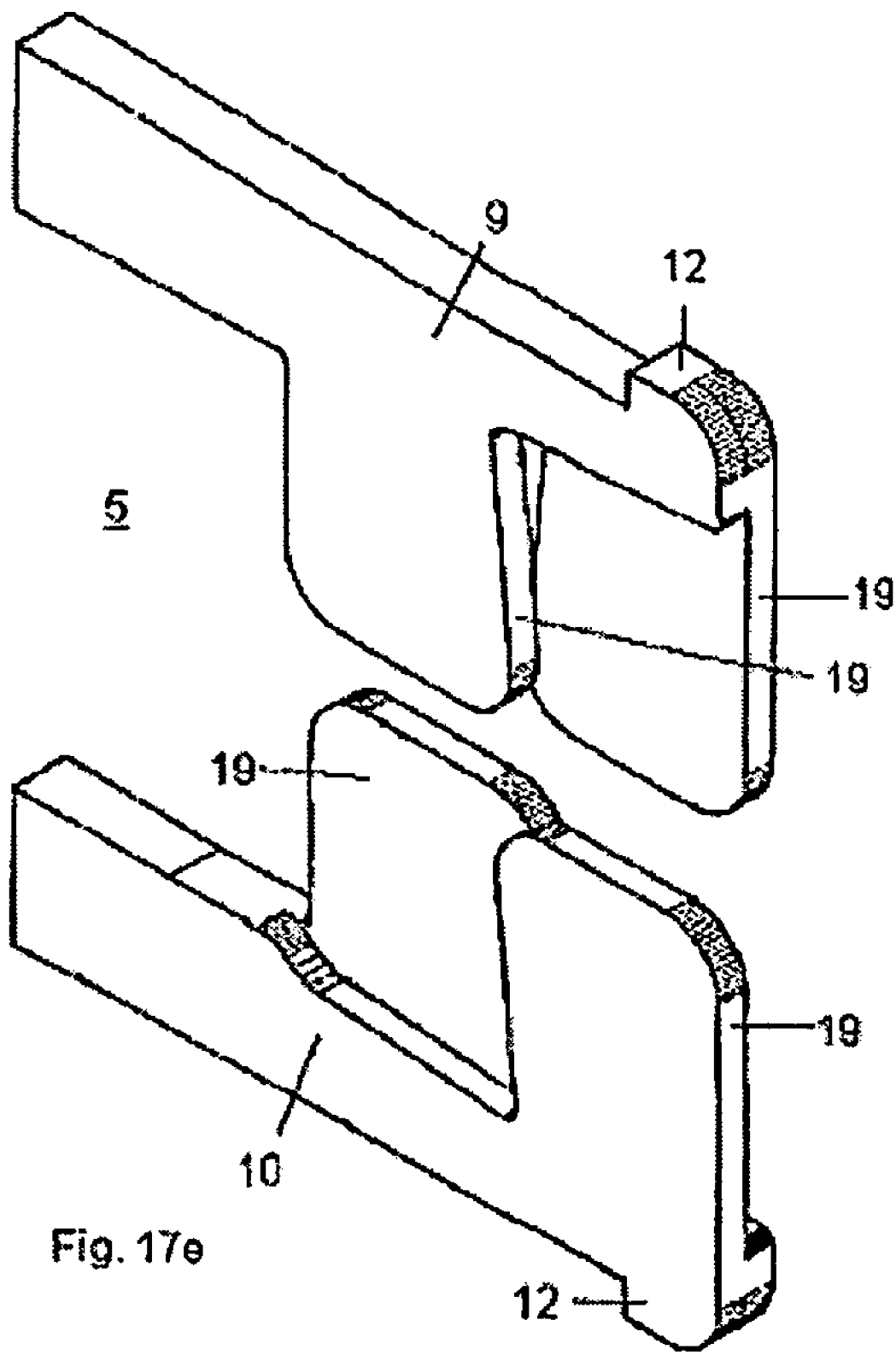
Figure 18A:
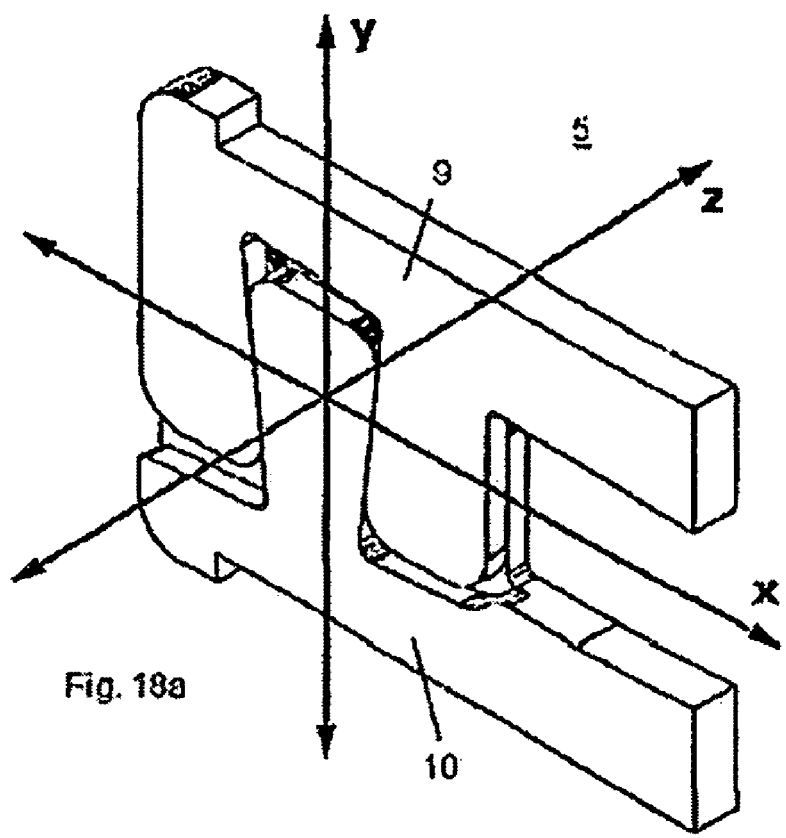
Figure 18B:
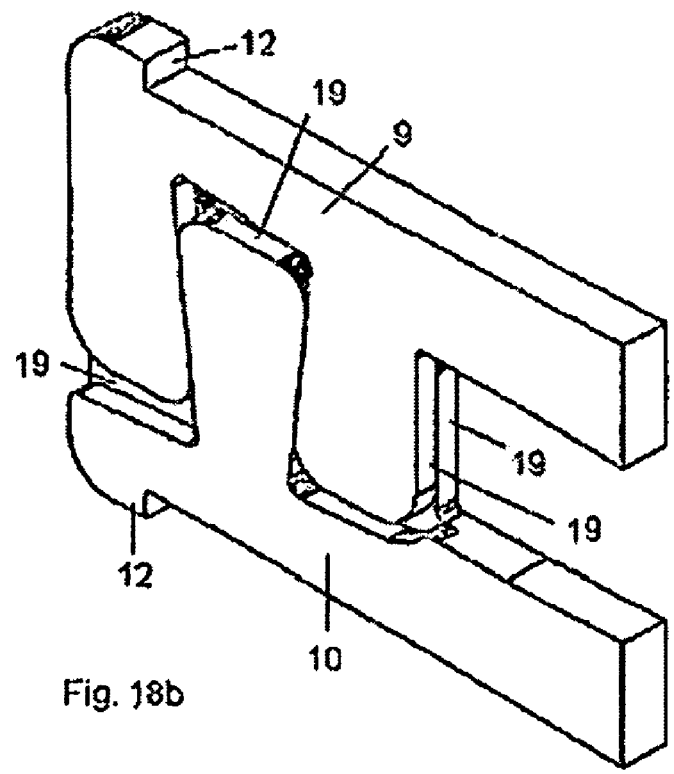
Figure 18C:
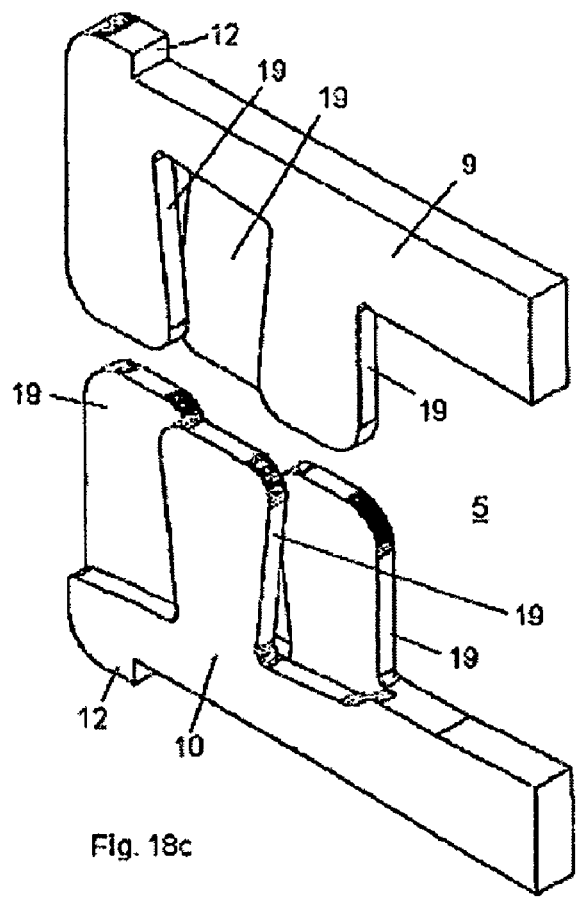
Figure 18D:
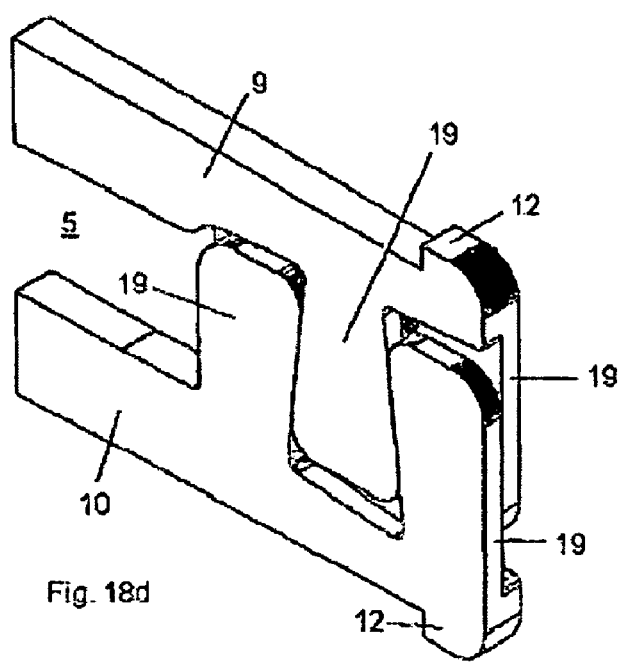
Figure 18E:
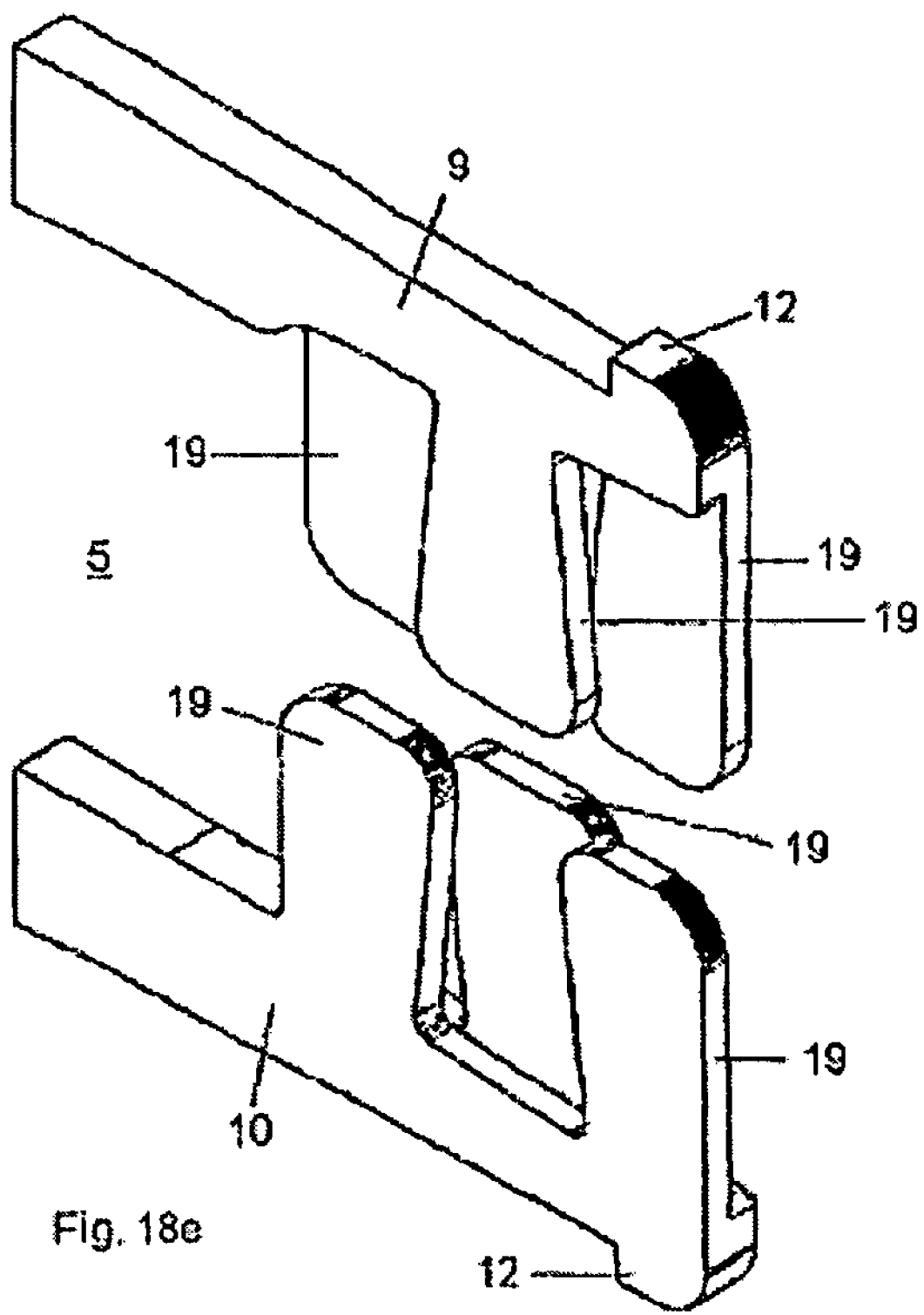

FIGS. 14a and 14b each show the back view of the embodiment of the connecting bracket 5 depicted in FIGS. 13b and 13c.

Shown in FIGS. 15 a-e is another embodiment of the connecting bracket 5. In this embodiment, the upper element 9 and the lower element 10 are designed in such a way that a displacement is blocked in five spatial directions. Thus, it is not possible to displace the upper and lower elements 9, 10 on the x axis and the z axis. A displacement on the y axis is possible in only one spatial direction, namely, by displacing the two elements away from each other (+y), as depicted in FIGS. 15c and 15e. One degree of freedom in the −y spatial direction is required so that the frontal eyeglass rim 2 can be opened in order to insert the eyeglass lenses.

Shown in FIGS. 16a to 16e is a perspective view of the connecting bracket 5, in which the upper and lower elements 9, 10 of the connecting bracket each consist of three portions of reduced material thickness, which are placed offset in such a way that a displacement of the elements 9, 10 in the +x, −x, +z, and −z as well as in the −y spatial direction is prevented. In this embodiment, the connecting bracket 5 is not blocked in at least one spatial direction (+y), so that the frontal eyeglass rim can be opened in order to enable a simple exchange of the eyeglass lenses. In order for this last remaining spatial direction to be blocked as well, a closing clip 4 is pushed over the connecting bracket 5 and is secured against slipping out by the projections 12 placed on the outer ends of the connecting bracket 5.

Shown in FIGS. 17 a-e and 18 a-e are embodiments of the connecting bracket 5, which, when the upper element 9 is pressed against the lower element 10, lock in place in each other. This embodiment of the connecting bracket 5 thus makes it possible to dispense with the use of a closure clip 4. However, it is also possible to put in place a closing clip 4 as additional securing.

FIGS. 17 a-e show an embodiment of the connecting bracket in which both the lower element 10 and the upper element 9 each have two portions of reduced material thickness, which prevent a displacement in all six spatial directions. In addition, the portions of reduced material thickness 19 are broadened in design in a dovetail-like manner, so that, when the upper element 9 and the lower element 10 are inserted into each other, they can be pulled back apart only by applying an increased force.

FIGS. 18 *a-e* also show an embodiment in which a displacement of the elements 9, 10 of the connecting bracket 5 is blocked in all spatial directions. In the embodiment shown in FIGS. 18 *a-e*, the upper element 9 and the lower element 10 each have three portions of reduced material thickness 19.

EXAMPLE FOR ASSEMBLY OF THE COMPONENTS

First of all, the eyeglass lens, which is provided with a groove, is inserted into the frontal eyeglass rim 2 and the connecting clip 4 is pushed on until it locks in place in the depression 13 (protuberances) of the connecting bracket 5. Then, by its narrow, outermost, spiral-shaped, curled end 6, the eyeglass temple 3 is passed through the remaining slot of the connecting bracket 5 of the frontal eyeglass rim 2, which is already closed by the connecting clip 4. Once this is done, the eyeglass temple 3 is pulled back into the side facing away from the eyeglass frame. In the process, the spiral-shaped curled end 6 of the eyeglass temple 3 expands away slightly from the stepped shaped indentation 16 until the latter has reached the back end of the connecting bracket 5 and locks in place there. The integral coil spring hinge 17 is now ready for use. No tools are needed for the assembly.

LIST OF REFERENCE NUMERALS

1 eyeglass frame
2 frontal eyeglass rim
3 eyeglass temple
4 closing clip
5 connecting bracket
6 spiral-shaped end
7 opening
8 dovetail link
9 upper element
10 lower element
11 recess (for eyeglass lenses)
12 projection
13 depression
14 flank
15 channel
16 indentation
17 coil spring hinge
18 surface
19 portion of reduced material strength

The invention claimed is:

1. An eyeglass frame, characterized in that it consists of a frontal eyeglass rim, connecting clips, and two eyeglass temples, wherein the frontal eyeglass rim comprises connecting brackets, the connecting clips are inserted over the connecting brackets, and the eyeglass temples have spiral-shaped ends, wherein the spiral-shaped end embraces the connecting bracket and the connecting clip.

2. The eyeglass frame according to claim 1, further characterized in that the eyeglass temple at its front end facing the frontal eyeglass rim has a stepped shaped indentation into which the narrower outer end of the eyeglass temple is bent first, then spirally curled.

3. The eyeglass frame according to claim 1, further characterized in that the frontal eyeglass rim essentially forms a plane, the connecting brackets being positioned at a bent angle on the terminal ends of the plane.

4. The eyeglass frame according to claim 1, further characterized in that the connecting bracket consists of an upper element and a lower element, which grip each other.

5. The eyeglass frame according to claim 1, further characterized in that the connecting bracket consists of an upper and a lower element, which grip each other in such a way that the elements cannot be mutually displaced in at least three spatial directions.

6. The eyeglass frame according to claim 1, further characterized in that the connecting brackets consist of an upper and a lower element, which together form a dovetail-like linkage.

7. The eyeglass frame according to claim 1, further characterized in that the connecting bracket consists of an upper and a lower element, wherein said elements have at least one portion of reduced material thickness and at least one of the elements has at least one portion of normal material thickness, the elements gripping each other in such a way that the portions of reduced material thickness respectively lie on one another.

8. The eyeglass frame according to claim 1, further characterized in that the connecting bracket consists of an upper and a lower element, wherein the upper and the lower elements of the connecting bracket can lock in place in each other.

9. The eyeglass frame according to claim 1, further characterized in that the connecting bracket has mechanisms by means of which the connecting clip is prevented from slipping.

10. The eyeglass frame according to claim 9, further characterized in that the mechanism is a projection on the outer side of the connecting bracket and/or a depression in the connecting bracket.

11. The eyeglass frame according to claim 1, further characterized in that the connecting brackets consist of an upper and a lower element and the connecting clip embraces the connecting bracket, so that the elements of the connecting bracket cannot be displaced in all six spatial directions.

12. The eyeglass frame according to claim 1, further characterized in that the flanks of the connecting clip are curled, and the two curled flanks of the connecting clip form a channel, in which the spiral-shaped end of the eyeglass temple is positioned.

13. The eyeglass frame according to claim 1, further characterized in that the connecting bracket, the connecting clip, and the spiral-shaped end of the eyeglass temple form a coil spring hinge.

14. A process for producing an eyeglass frame according to claim 1, characterized in that the connecting clips are pushed onto the connecting brackets until they lock in place, and then the eyeglass temples, by their narrow, outermost, spiral-shaped, curled ends, are passed into the remaining openings between the upper and lower elements of the connecting brackets, which have already been closed by the connecting clips, of the frontal eyeglass rim and the eyeglass temples are pulled into the side facing away from the eyeglass rim.

* * * * *